(12) United States Patent
Sakai et al.

(10) Patent No.: US 8,044,548 B2
(45) Date of Patent: Oct. 25, 2011

(54) PERMANENT-MAGNET-TYPE ROTATING ELECTRICAL MACHINE

(75) Inventors: Kazuto Sakai, Yokosuka (JP); Masanori Arata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 260 days.

(21) Appl. No.: 12/438,216

(22) PCT Filed: Aug. 23, 2006

(86) PCT No.: PCT/JP2006/316510
§ 371 (c)(1),
(2), (4) Date: Feb. 20, 2009

(87) PCT Pub. No.: WO2008/023413
PCT Pub. Date: Feb. 28, 2008

(65) Prior Publication Data
US 2009/0236923 A1  Sep. 24, 2009

(51) Int. Cl.
*H02K 21/12* (2006.01)
(52) U.S. Cl. ......... 310/156.43; 310/156.36; 310/156.53; 310/156.56
(58) Field of Classification Search ............. 310/156.43, 310/154, 156, 153.36, 156.53, 156.56; *H02K 21/12*
See application file for complete search history.

(56) References Cited

U.S. PATENT DOCUMENTS

| | | | | |
|---|---|---|---|---|
| 4,110,718 | A * | 8/1978 | Odor et al. .................. | 335/296 |
| 5,631,512 | A | 5/1997 | Kawabata et al. | |
| 5,929,547 | A * | 7/1999 | Kim .......................... | 310/156.53 |
| 6,025,667 | A * | 2/2000 | Narita et al. ............... | 310/156.53 |
| 6,087,751 | A * | 7/2000 | Sakai ......................... | 310/156.56 |
| 6,177,745 | B1 * | 1/2001 | Narita et al. ............... | 310/156.43 |
| 6,664,688 | B2 * | 12/2003 | Naito et al. ................. | 310/156.01 |

(Continued)

FOREIGN PATENT DOCUMENTS

CN   1516915 A   7/2004

(Continued)

OTHER PUBLICATIONS

Nasar et al, "Permanent Magnet, Reluctance and Self Synchronous Motors", CRC Press, 1993, pp. 37-39.*

(Continued)

*Primary Examiner* — Quyen Leung
*Assistant Examiner* — John K Kim
(74) *Attorney, Agent, or Firm* — Foley & Lardner LLP

(57) ABSTRACT

An object of the present invention is to provide a permanent-magnet-type rotating electrical machine capable of realizing a variable-speed operation at high output in a wide range from low speed to high speed and improving efficiency and reliability. The permanent-magnet-type rotating electrical machine of the present invention includes a stator provided with a coil and a rotor in which there are arranged a low-coercive-force permanent magnet whose coercive force is of such a level that a magnetic field created by a current of the stator coil may irreversibly change the flux density of the magnet and a high-coercive-force permanent magnet whose coercive force is equal to or larger than twice that of the low-coercive-force permanent magnet. At the time of high-speed rotation with a voltage of the permanent-magnet-type rotating electrical machine being around or over a power source maximum voltage, the low-coercive-force permanent magnet is magnetized with a magnetic field created by a current in such a way as to decrease total linkage flux of the low- and high-coercive-force permanent magnets, thereby adjusting a total linkage flux amount.

18 Claims, 19 Drawing Sheets

U.S. PATENT DOCUMENTS

| | | | |
|---|---|---|---|
| 6,703,746 B2* | 3/2004 | Biais et al. | 310/156.53 |
| 6,800,977 B1 | 10/2004 | Ostovic | |
| 6,849,981 B2 | 2/2005 | Kojima et al. | |
| 6,906,444 B2* | 6/2005 | Hattori et al. | 310/156.53 |
| 7,436,095 B2* | 10/2008 | Aydin et al. | 310/156.53 |
| 7,436,096 B2* | 10/2008 | Guven et al. | 310/156.53 |
| 2002/0175644 A1* | 11/2002 | Su | 318/254 |
| 2004/0100221 A1* | 5/2004 | Fu | 318/700 |
| 2004/0149357 A1* | 8/2004 | Kakimoto et al. | 148/301 |
| 2005/0046370 A1* | 3/2005 | Gallegos-Lopez et al. | 318/434 |
| 2005/0140236 A1* | 6/2005 | Jeong et al. | 310/156.53 |
| 2007/0057589 A1* | 3/2007 | Tatematsu et al. | 310/156.53 |
| 2007/0096578 A1* | 5/2007 | Jahns et al. | 310/156.53 |
| 2007/0228862 A1* | 10/2007 | Welchko et al. | 310/156.53 |
| 2007/0284960 A1* | 12/2007 | Fulton et al. | 310/156.53 |
| 2009/0236923 A1* | 9/2009 | Sakai et al. | 310/156.43 |

FOREIGN PATENT DOCUMENTS

| | | |
|---|---|---|
| JP | 6-189481 A | 7/1994 |
| JP | 7-336919 A | 12/1995 |
| JP | 8-009610 A | 1/1996 |
| JP | 11-027913 A | 1/1999 |
| JP | 11-136912 | 5/1999 |
| JP | 2002-044889 A | 2/2002 |
| JP | 2002-136011 A | 5/2002 |
| WO | WO 03/079516 A1 | 9/2003 |

OTHER PUBLICATIONS

Chapman, "Electric Machinery Foundation", McGraw Hill, 1991, p. 340.* wikipedia, p. 7, "Demagnetizing ferromagnets".* wikipedia, "Demagnetizing ferromagnets" in p. 7 "Magnet", Feb. 24, 2011.*

Y. Takeda et al., "Design and Control of Interior Permanent Magnet Synchronous Motor," Interior Permanent Magnet Syncronous Motor, Oct. 25, 2001, pp. 1-6, English translation 1-12.

* cited by examiner

PERMANENT-MAGNET-TYPE ROTATING ELECTRICAL MACHINE

TECHNICAL FIELD

The present invention relates to a permanent-magnet-type rotating electrical machine.

BACKGROUND TECHNOLOGY

Generally, permanent-magnet motors are classified into two types. One is a surface-magnet-type motor having permanent magnets adhered to an outer circumference of a rotor core and the other is an internal-magnet-type motor having permanent magnets embedded in a rotor core. For a variable-speed drive motor, the internal-magnet-type motor is appropriate.

With reference to FIG. 19, a structure of a rotor of the internal-magnet-type motor will be explained. In FIG. 19, 11 is the rotor, 12 is a rotor core, and 14 is a high-coercive-force permanent magnet. An outer circumferential area of the rotor core 12 is provided with rectangular hollows at regular pitches, the number of the hollows being equal to the number of magnetic poles. The rotor 11 illustrated in FIG. 19 has four poles, and therefore, four hollows are formed and the permanent magnets 14 are inserted therein, respectively. The permanent magnet 14 is magnetized in a radial direction of the rotor, i.e., in a direction orthogonal to a side of the rectangular section of the permanent magnet 14 that faces an air gap. The permanent magnet 14 is usually an NdFeB permanent magnet having a high coercive force so that it is not demagnetized with a load current. The rotor core 12 is formed by laminating electromagnetic sheets through which the hollows are punched. A related art of this kind is described in "Design and Control of Internal Magnet Synchronous Motor," Takeda Yoji, et al., published by Ohm-sha. A modification of the internal type is described in Japanese Unexamined Patent Application Publication No. H07-336919. High-output motors with excellent variable speed performance are permanent-magnet-type reluctance rotating electrical machines described in Japanese Unexamined Patent Application Publication No. H11-27913 and Japanese Unexamined Patent Application Publication No. H11-136912.

A permanent-magnet-type rotating electrical machine always generates constant linkage flux from permanent magnets, to increase a voltage induced by the permanent magnets in proportion to rotation speed. When carrying out a variable-speed operation from low speed to high speed, the permanent magnets induce a very high voltage at high rotation speed. The voltage induced by the permanent magnets is applied to electronic parts of an inverter, and if the applied voltage exceeds a withstand voltage of the electronic parts, the parts will cause insulation breakage. It is necessary, therefore, to design the machine so that the flux amount of the permanent magnets is below the withstand voltage. Such a design, however, lowers the output and efficiency of the permanent-magnet-type rotating electrical machine in a low-speed zone.

If a variable-speed operation is carried out in such a way as to provide nearly a constant output from low speed to high speed, the voltage of the rotating electrical machine will reach a source voltage upper limit in a high rotation speed zone. This is because the linkage flux of the permanent magnets is constant. In the high rotation speed zone, therefore, a current necessary for providing the output will not be passed. This greatly drops the output in the high rotation speed zone and the variable-speed operation will not be carried out in a wide range up to high rotation speed. To cope with this, recent techniques of expanding a variable-speed range employ flux-weakening control described in the above-mentioned "Design and Control of Internal Magnet Synchronous Motor." The flux-weakening control applies a demagnetizing field created with a d-axis current to the high-coercive-force permanent magnets 4, to move a magnetic operating point of the permanent magnets within a reversible range and change a flux amount. Accordingly, the internal-magnet-type rotating electrical machine performing the field-weakening control employs as an internal permanent magnet an NdFeB magnet that has a high coercive force and is not irreversibly demagnetized by the demagnetizing field.

The demagnetizing field created with a d-axis current decreases the linkage flux of the permanent magnets and the reduction in the linkage flux produces a voltage margin for the source voltage upper limit. This results in increasing a current to increase output in the high-speed zone. The voltage margin also allows rotation speed to be increased, to expand a variable speed operating range.

This technique, however, must continuously apply the demagnetizing field to the permanent magnets. For this, a d-axis current that contributes nothing to an output must always be passed, to increase an iron loss and deteriorate efficiency. In addition, the demagnetizing field produced by a d-axis current generates harmonic flux that causes a voltage increase. Such a voltage increase limits the voltage reduction achieved by the flux-weakening control. These factors make it difficult for the flux-weakening control to conduct a variable-speed operation of the internal-magnet-type rotating electrical machine at speeds over three times a base speed. In addition, the harmonic flux increases an iron loss and generates an electromagnetic force that produces vibration.

When the internal-permanent-magnet motor is applied for a drive motor of a hybrid car, the motor rotates together with an engine when only the engine is used to drive the hybrid car. In this case, a voltage induced by the permanent magnets of the motor at middle or high rotation speed exceeds a power source voltage. To cope with this, the field-weakening control must continuously pass a d-axis current. In this state, the motor only produces a loss to deteriorate an overall operating efficiency.

When the internal-permanent-magnet motor is applied for a drive motor of an electric train, the electric train sometimes carries out a coasting operation. Then, like the above-mentioned example, the flux-weakening control must continuously pass a d-axis current, so that a voltage induced by the permanent magnets will not exceed a power source voltage. In this state, the motor only produces a loss to deteriorate an overall operating efficiency.

DISCLOSURE OF INVENTION

The present invention has been made to solve the above-mentioned problems of the related arts and an object of the present invention is to provide a permanent-magnet-type rotating electrical machine capable of conducting a variable-speed operation in a wide range from low speed to high speed, realizing high torque in a low rotation speed zone and high output in middle and high rotation speed zones, and improving efficiency and reliability.

A permanent-magnet-type rotating electrical machine according to the present invention is characterized in that it includes a stator provided with a stator coil and a rotor having a rotor core in which there are arranged a low-coercive-force permanent magnet whose coercive force is of such a level that a magnetic field created by a current of the stator coil may irreversibly change the flux density of the magnet and a highcoercive-force permanent magnet whose coercive force is equal to or larger than twice that of the low-coercive-force permanent magnet.

The present invention can provide the permanent-magnet-type rotating electrical machine capable of conducting a variable-speed operation in a wide range from low speed to high speed, realizing high torque in a low rotation speed zone and high output in middle and high rotation speed zones, and improving efficiency and reliability.

BEST MODE OF IMPLEMENTING INVENTION

The embodiments of the present invention will be explained in detail with reference to the drawings.

First Embodiment

Figure 1:
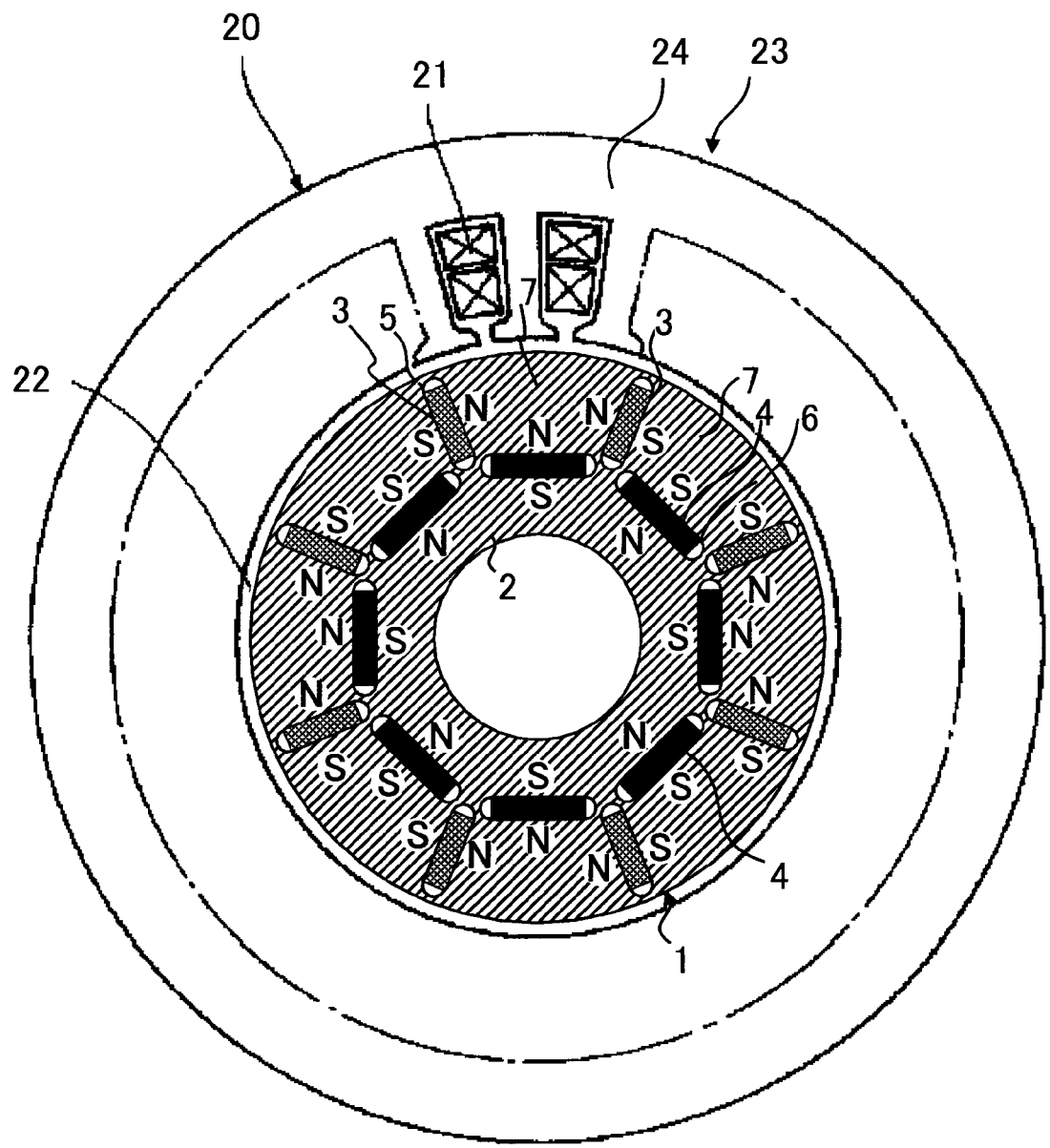
FIG. 1 is a sectional view illustrating a permanent-magnet-type rotating electrical machine according to a first embodiment of the present invention.
Figure 2:
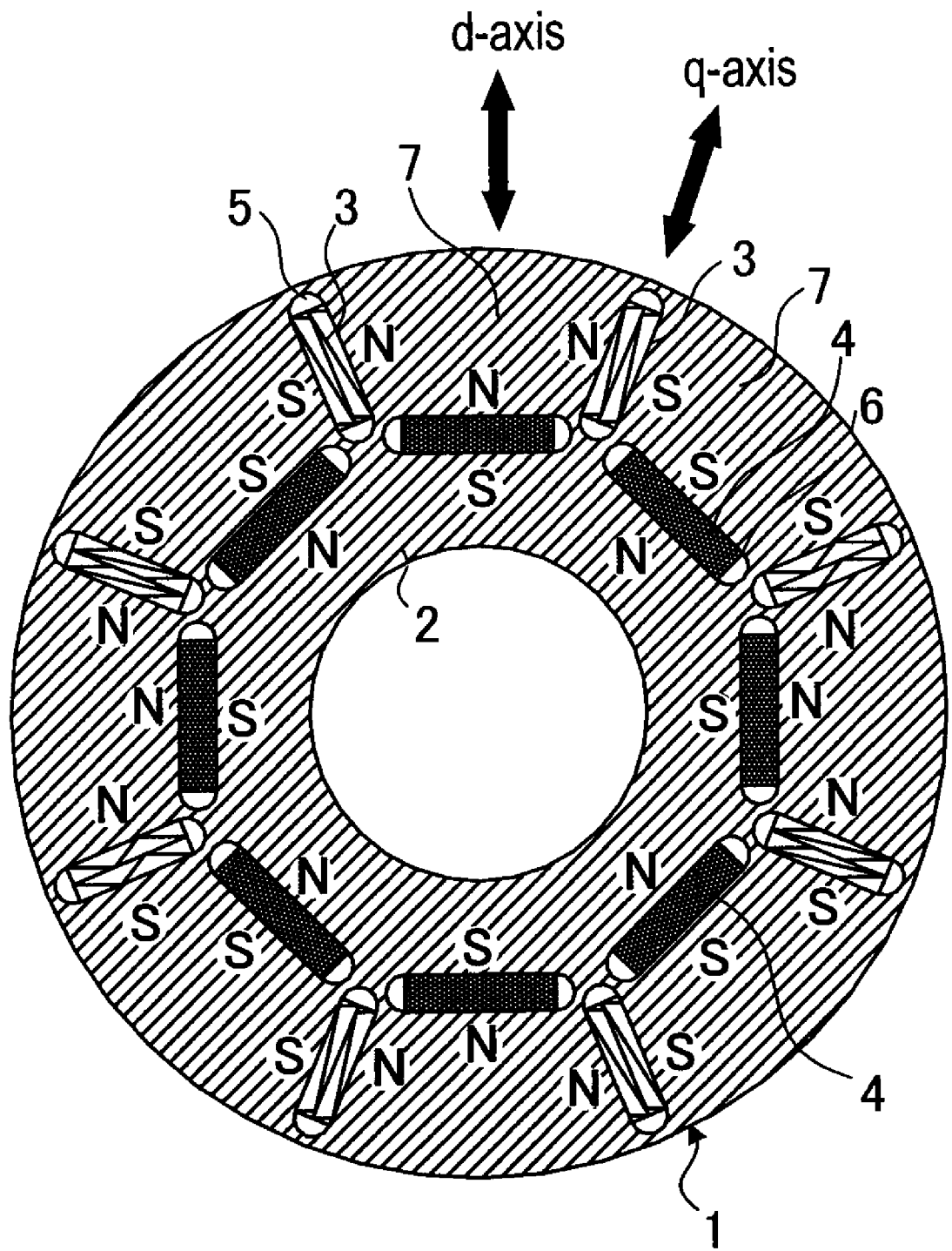
FIG. 2 is a sectional view illustrating a rotor of the permanent-magnet-type rotating electrical machine according to the first embodiment of the present invention.

As illustrated in FIGS. 1 and 2, a permanent-magnet-type rotating electrical machine 20 according to the first embodiment of the present invention has a rotor 1. The rotor 1 has a rotor core 2 in which eight low-coercive-force permanent magnets 3 and eight high-coercive-force permanent magnets 4 are embedded at equal pitches. At a location of the rotor core 2 where the low-coercive-force permanent magnet 3 is embedded, a first hollow 5 is formed at each end of the permanent magnet 3. At a location of the rotor core 2 where the high-coercive-force permanent magnet 4 is embedded, a second hollow 6 is formed at each end of the permanent magnet 4. "7" indicates a magnetic pole portion of the rotor core 2. The rotor core 2 is constituted by laminating silicon steel plates. The low-coercive-force permanent magnet 3 is an alnico magnet or a FeCrCo magnet. The high-coercive-force magnet 4 is an NdFeB magnet.

As illustrated in FIG. 1, a stator 23 is constituted by winding a stator coil 21 along inner teeth of a stator core 24. The rotor 1 is accommodated in an inner space of the stator core 24 of the stator 23, to form the permanent-magnet-type rotating electrical machine 20 of the embodiment. An inner circumferential face of the stator core 24 faces an outer circumferential face of the rotor 1 with an air gap 22 interposing between them.

Figure 3:
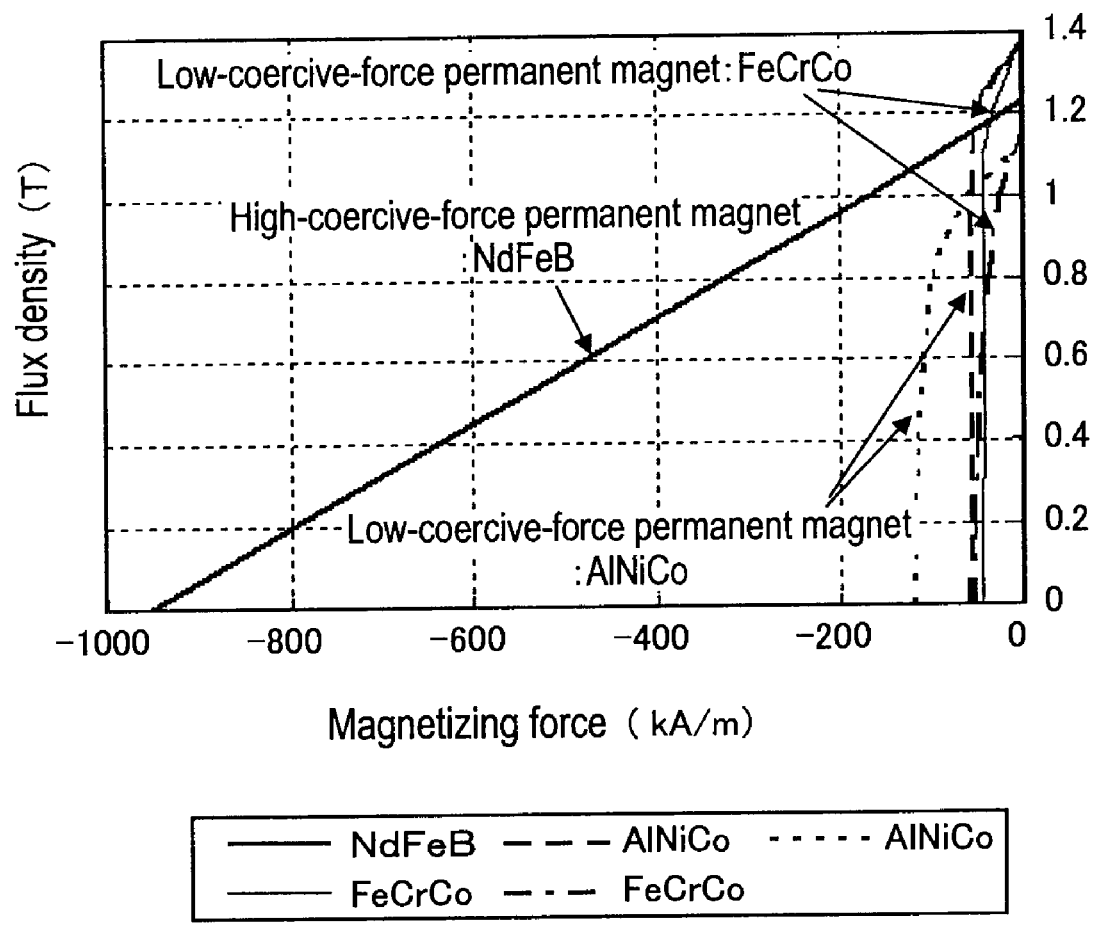
FIG. 3 is a view illustrating the magnetic characteristics of low- and high-coercive-force permanent magnets used by the first embodiment of the present invention.

FIG. 3 shows the magnetic characteristics of an alnico (AlNiCo) magnet serving as the low-coercive-force permanent magnet of the rotor 1 adopted by the embodiment, an FeCrCo magnet that is a low-coercive-force magnet, and an NdFeB magnet serving as the high-coercive-force permanent magnet. The coercive force (a magnetic field where a flux density becomes zero) of the alnico magnet is 60 to 120 kA/m and is 1/15 to 1/8 of a coercive force of 950 kA/m of the NdFeB magnet. The coercive force of the FeCrCo magnet is about 60 kA/m which is 1/15 of the coercive force of 950 kA/m of the NdFeB magnet. It is understood that the alnico magnet and FeCrCo magnet each have a coercive force fairly lower than the NdFeB magnet. According to the embodiment, the high-coercive-force permanent magnet 4 has a coercive force 8 to 15 times higher than that of the low-coercive-force permanent magnet 3, to provide the rotating electrical machine with excellent characteristics.

Each low-coercive-force permanent magnet 3 is embedded in the rotor core 2 and each end of the low-coercive-force permanent magnet 3 is provided with the first hollow 5. The low-coercive-force permanent magnet 3 is arranged in a radial direction of the rotor that agrees with a q-axis serving as an inter-polar center axis and is magnetized in a direction orthogonal to the radial direction. Each high-coercive-force permanent magnet 4 is embedded in the rotor core 2 and each end of the high-coercive-force permanent magnet 4 is provided with the second hollow 6. The high-coercive-force permanent magnet 4 is arranged on the inner circumferential side of the rotor 1 between two low-coercive-force permanent magnets 3 and is oriented in a circumferential direction of the rotor 1. The high-coercive-force permanent magnet 4 is magnetized in a direction orthogonal to the circumferential direction of the rotor 1.

Figure 4:
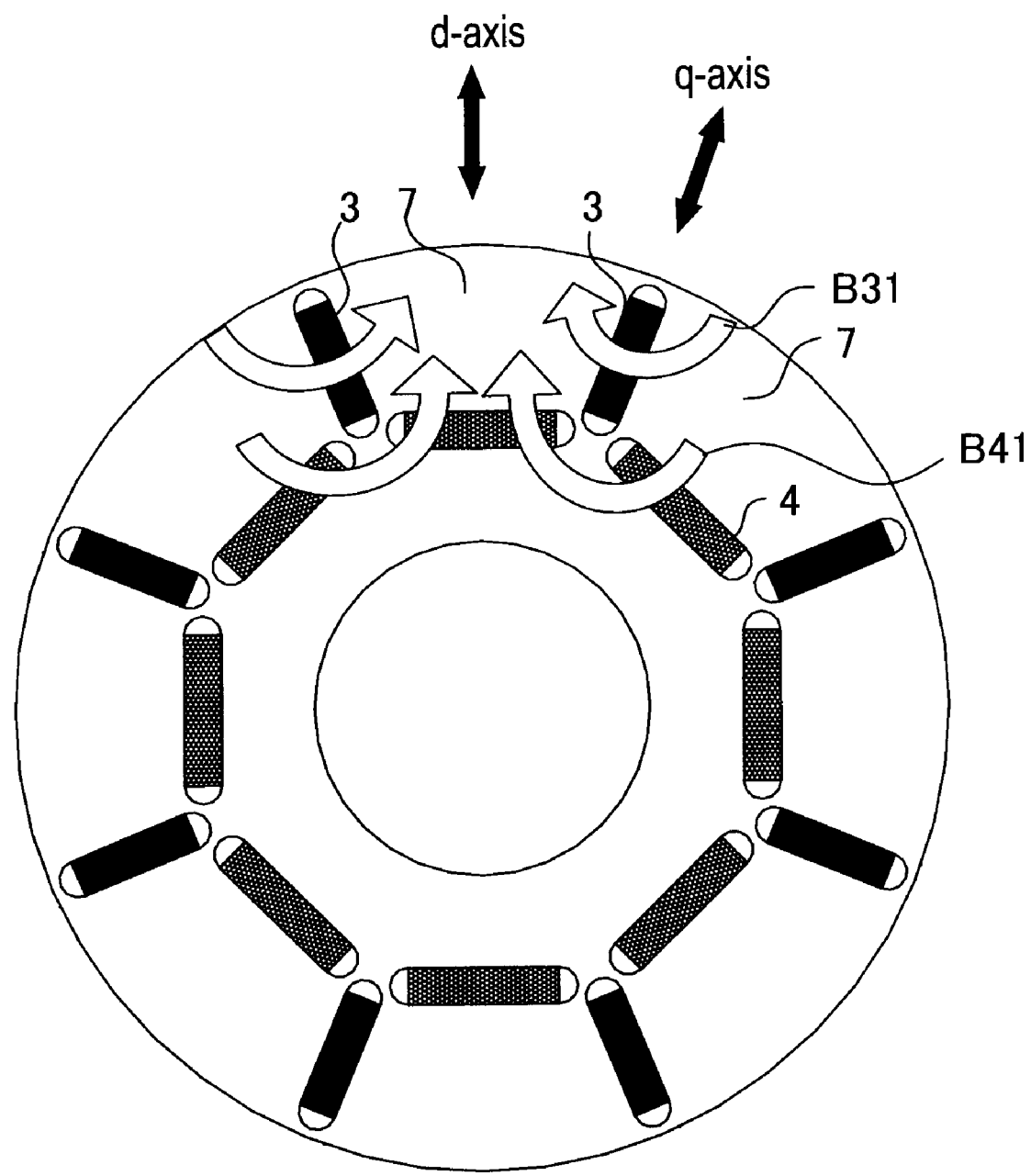
FIG. 4 is a sectional view illustrating flux of permanent magnets in an initial state of the rotor according to the first embodiment of the present invention.

Each magnetic pole portion 7 of the rotor core 2 is surrounded by two low-coercive-force permanent magnets 3 and one high-coercive-force permanent magnet 4. As shown in FIG. 4, a center axis of the magnetic pole portion 7 of the rotor core 2 agrees with a d-axis and an inter-polar center axis agrees with a q-axis. The low-coercive-force permanent magnet 3 is arranged in the direction of the q-axis serving as the inter-polar center axis and is magnetized in a direction that forms 90° or −90° with respect to the q-axis. The faces of adjacent low-coercive-force permanent magnets 3 that face each other have the same polarity. The high-coercive-force permanent magnet 4 is arranged in a direction orthogonal to the d-axis serving as the center axis of the magnetic pole portion 7 and is magnetized in a direction that forms 0° or 180° with respect to the d-axis. The magnetic pole portions 7 related to adjacent high-coercive-force permanent magnets 4 are oppositely polarized.

In the rotor 1 of the embodiment, the FeCrCo magnet or alnico magnet adopted for the low-coercive-force permanent magnet 3 has a low coercive force of 60 to 120 kA/m. Such a low-coercive-force magnet can be magnetized with a magnetic field of 200 to 300 kA/m. The NdFeB magnet adopted for the high-coercive-force permanent magnet 4 has a high coercive force of 950 kA/m and is magnetized with a magnetic field of about 2400 kA/m. Namely, the low-coercive-force permanent magnet 3 is magnetized with a magnetic field of about 1/10 of that for magnetizing the high-coercive-force permanent magnet 4. The permanent-magnet-type rotating electrical machine 20 adopting the rotor 1 of the embodiment passes a pulse current to the stator coil for a very short time (about 100 μs to 1 ms) to form a magnetic field that acts on the low-coercive-force permanent magnets 3. Theoretically, a magnetizing field of 250 kA/m sufficiently magnetizes the low-coercive-force permanent magnets 3 while no magnetization that may cause irreversible demagnetization occurs on the high-coercive-force permanent magnets 4.

Figure 5:
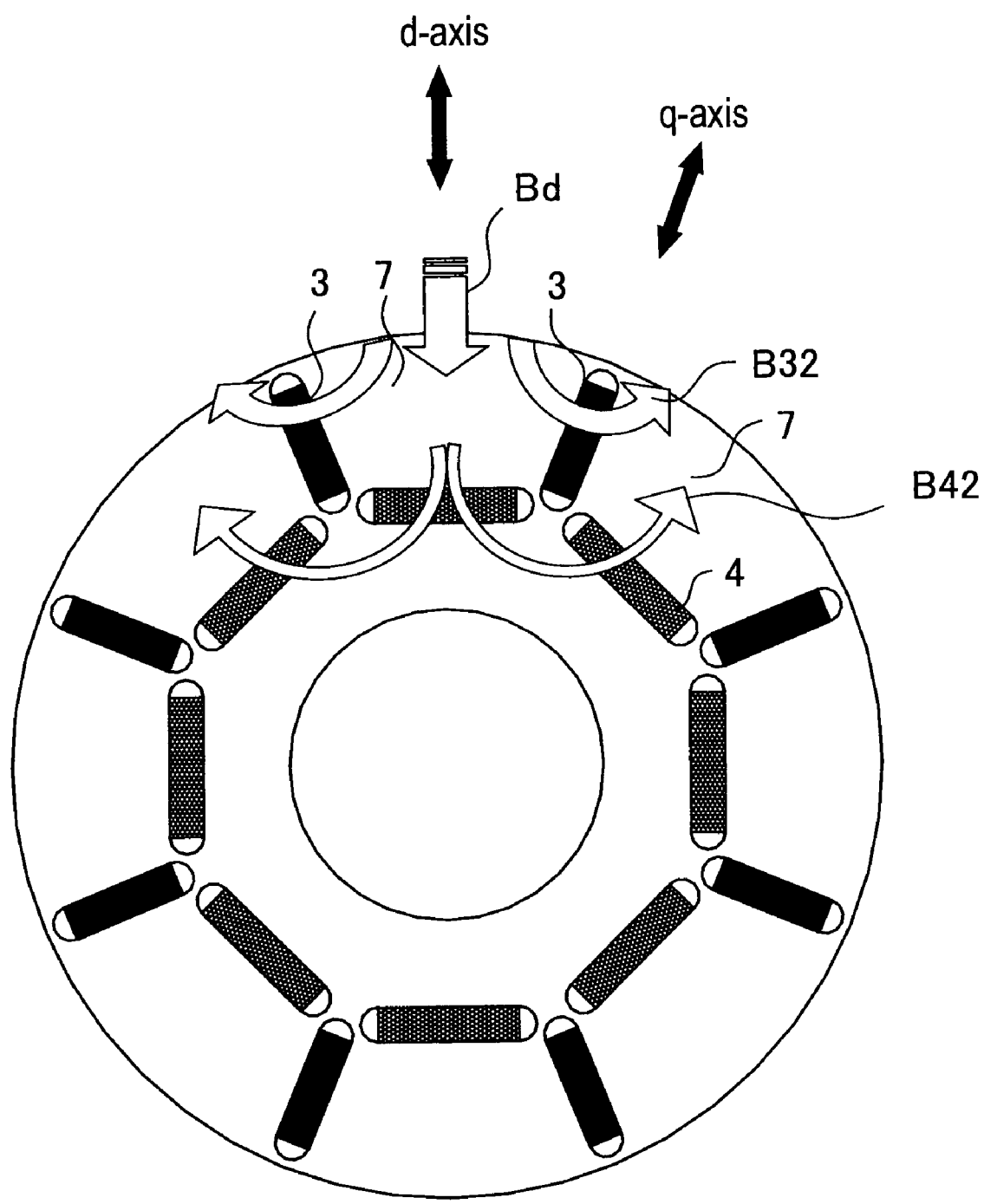
FIG. 5 is a sectional view illustrating flux of a magnetizing field created by a d-axis current in the rotor according to the first embodiment of the present invention.

FIG. 4 is a view illustrating fluxes B31 and B41 of the permanent magnets 3 and 4 in an initial state before a d-axis current is applied to produce a magnetizing field, according to the embodiment. FIG. 5 is a view illustrating fluxes B32 and B42 of the permanent magnets 3 and 4 when a magnetizing field is applied. Although FIGS. 4 and 5 illustrate a flux distribution for one pole, the same flux distribution occurs on each of the four poles. The pulse current that forms the magnetizing field is a d-axis current component of the armature coil of the stator. In FIG. 5, each low-coercive-force permanent magnet 3 is demagnetized. Namely, a negative d-axis current forms a demagnetizing field that acts from the polar center of the rotor 1 toward the low- and high-coercive-force permanent magnets 3 and 4 oppositely to the magnetizing direction. In the permanent-magnet-type rotating electrical machine 20 employing the rotor 1 of the embodiment, the magnetic field Bd created by the d-axis current acts on two high-coercive-force permanent magnets 4 (two permanent magnets of N. and S. poles). Accordingly, the magnetic field acting on the high-coercive-force permanent magnet 4 is about half the magnetic field acting on the low-coercive-force permanent magnet 3. As a result, in the permanent-magnet-type rotating electrical machine employing the rotor 1 of the embodiment, the magnetic field Bd created by the d-axis current easily magnetizes the low-coercive-force permanent magnets 3.

Figure 6:
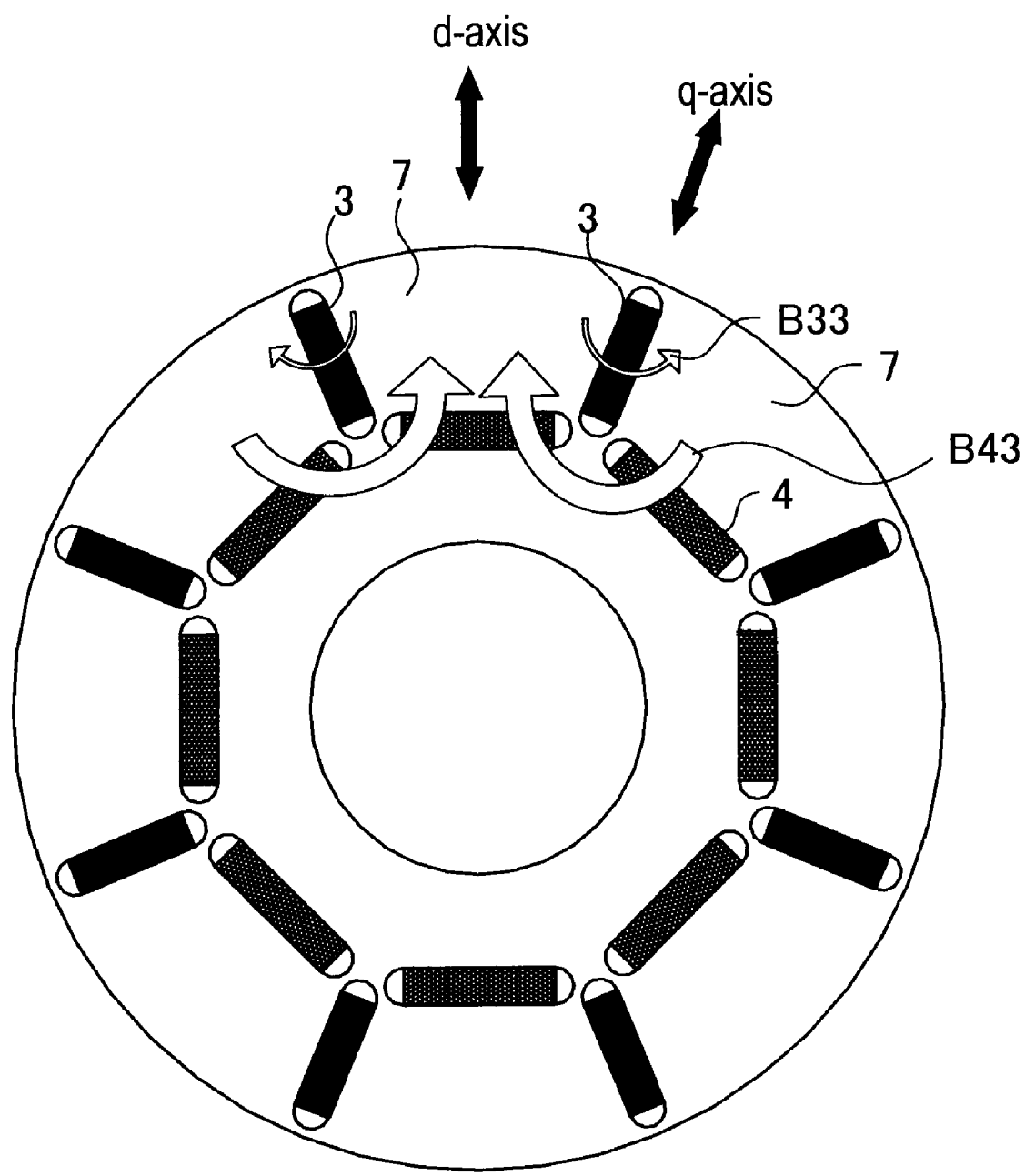
FIG. 6 is a sectional view illustrating flux after the action of the magnetizing field created by the d-axis current in the rotor according to the first embodiment of the present invention.

FIG. 6 is a view illustrating fluxes B33 and B43 after magnetization of the rotor 1 according to the embodiment. The low-coercive-force permanent magnet 3 has a coercive force of about 1/10 of that of the high-coercive-force permanent magnet 4 and receives a magnetizing field of two times as large as that acting on the high-coercive-force permanent magnet 4. In FIG. 6, the low-coercive-force permanent magnet 3 is magnetized in a direction opposite to the initial magnetizing direction of FIG. 4. The magnitude of the d-axis current can be changed to change the strength of the magnetizing field, thereby adjusting the magnetized state of the low-coercive-force permanent magnet 3. Namely, it is possible to establish three states, i.e., a state of lowering the magnetic force of the low-coercive-force permanent magnet 3, a state of zeroing the flux of the low-coercive-force permanent magnet 3, and a state of reversing the flux direction of the low-coercive-force permanent magnet 3. On the other hand, the high-coercive-force permanent magnet 4 has a coercive force 10 times as large as that of the low-coercive-force permanent magnet 3 or larger, and according to the embodiment, receives a magnetizing field of ½ of that acting on the low-coercive-force permanent magnet 3. Accordingly, a magnetic field that magnetizes the low-coercive-force permanent magnet 3 keeps the high-coercive-force permanent magnet 4 in a reversible demagnetization state, so that the high-coercive-force permanent magnet 4 may maintain the initial flux even after magnetization.

With the above-mentioned configuration, the permanent-magnet-type rotating electrical machine employing the rotor 1 of the embodiment can widely change a linkage flux amount of the low-coercive-force permanent magnet 3 with a d-axis current of the rotor 1 and can reverse the magnetizing direction thereof. With linkage flux of the high-coercive-force permanent magnet 4 being in a normal direction, linkage flux of the low-coercive-force permanent magnet 3 is adjustable in a wide range from a maximum value in the normal direction to zero to a maximum value in the opposite direction. Accordingly, the rotor 1 of the embodiment can adjust the total linkage flux amount of the low- and high-coercive-force permanent magnets 3 and 4 in a wide range by magnetizing each low-coercive-force permanent magnet 3 with a d-axis current.

For example, in a low-speed zone, the low-coercive-force permanent magnet 3 is magnetized with a d-axis current so that the permanent magnet 3 takes a maximum flux amount in the same direction (initial state) as the direction of the linkage flux of the high-coercive-force permanent magnet 4, to maximize torque produced by the permanent magnets, thereby maximizing the torque and output of the rotating electrical machine.

In middle- and high-speed zones, the flux amount of the low-coercive-force permanent magnet 3 is decreased as shown in FIG. 6, to decrease the total linkage flux amount. This results in decreasing the voltage of the rotating electrical machine, to make a margin for a source voltage upper limit. This enables rotation speed (frequency) to be increased further.

To further increase the maximum speed (to expand a variable-speed range, for example, five times a base speed or more), the low-coercive-force permanent magnet 3 is magnetized in a direction opposite to the linkage flux of the high-coercive-force permanent magnet 4 (the flux direction is as illustrated in FIG. 6 and magnetization is carried out to the maximum). The total linkage flux of the permanent magnets will be minimized to the linkage flux difference between the high-coercive-force permanent magnets 4 and the low-coercive-force permanent magnets 3. As a result, the voltage of the rotating electrical machine is minimized to increase the rotation speed (frequency) to the maximum.

Adopted for the rotating electrical machine 20 illustrated in FIG. 1, the rotor 1 of the embodiment realizes a high-output variable-speed operation in a wide range from low speed to high speed. It passes a magnetizing current only for a very short time when changing linkage flux. Accordingly, it can greatly reduce a loss and improve efficiency.

To provide output, the rotating electrical machine 20 passes a q-axis current to the stator coil 21, so that a magnetic action between the q-axis current and the flux of the permanent magnets 3 and 4 may generate torque. At this time, the q-axis current creates a magnetic field. For this, the low-coercive-force permanent magnet 3 is arranged along the q-axis and is magnetized in a direction orthogonal to the q-axis. Namely, the low-coercive-force permanent magnet 3 is magnetized orthogonal to the magnetic field created by the q-axis current, and therefore, is little affected thereby.

Next, the action of the first and second hollows 5 and 6 will be explained. The hollows 5 and 6 relax a stress concentration and demagnetizing field of the rotor core 2 when a centrifugal force by the permanent magnets acts on the rotor core 2. As illustrated in FIG. 2, the hollows 5 and 6 provide the iron core 2 with curved shapes to relax stress. A magnetic field produced by a current may concentrate at each corner of the permanent magnets 3 and 4, so that a demagnetizing field may act at the corner to irreversibly demagnetize the corner. The hollows 5 and 6 provided for the ends of the magnets of the rotor 1 of the embodiment can relax such a demagnetizing field caused by a current at each end of the permanent magnets.

The rotor 1 of the embodiment having the above-mentioned configuration provides the following actions and effects. With linkage flux of the high-coercive-force permanent magnets 4 being in a normal direction, linkage flux of the low-coercive-force permanent magnets 3 is adjustable in a wide range from a maximum value in the normal direction to zero to a maximum value in the opposite direction. By magnetizing the low-coercive-force permanent magnets 3 with a d-axis current, the total linkage flux amount of the low- and high-coercive-force permanent magnets 3 and 4 is adjustable in a wide range. Adjusting the total linkage flux amount of the permanent magnets in a wide range results in adjusting the voltage of the rotating electrical machine 20 adopting the rotor 1 in a wide range. Magnetization is carried out with a pulse current passed for a very short time, and therefore, there is no need of continuously passing a field-weakening current, thereby greatly reducing a loss. Eliminating the need of conducting the conventional field-weakening control leads to generate no iron loss due to harmonic flux. In this way, the rotor 1 of the embodiment enables the rotating electrical machine 20 to carry out a high-output variable-speed operation in a wide range from low speed to high speed and improve efficiency.

In connection with a voltage induced by the permanent magnets, the low-coercive-force permanent magnets 3 are magnetized with a d-axis current, to reduce the total linkage flux amount of the permanent magnets, thereby preventing electronic parts of an inverter from being broken with the induced voltage of the permanent magnets and improving reliability. When the rotating electrical machine 20 is rotated under no load, the low-coercive-force permanent magnets 3 are magnetized with a d-axis current, to reduce the total linkage flux amount of the permanent magnets, thereby greatly decreasing the induced voltage, eliminating the need of always passing a field-weakening current for decreasing the induced voltage, and improving total efficiency. Although the embodiment employs eight poles, the embodiment may employ any other number of poles. The structure of the stator 23 is not limited to that of the embodiment. Any stator applicable to general rotating electrical machines is adoptable. For example, instead of the distributed coil stator illustrated in the drawings, a concentrated coil stator may be adopted. These matters are applicable to the other embodiments.

Second Embodiment

A rotating electrical machine 20 according to a second embodiment of the present invention is characterized in that, when a rotor 1 is at a highest rotation speed, a counter electromotive voltage generated by high-coercive-force permanent magnets 4 of the rotor is suppressed below a withstand voltage of electronic parts of an inverter serving as a power source of the rotating electrical machine.

A counter electromotive voltage caused by permanent magnets increases in proportion to rotation speed. If the counter electromotive voltage is applied to electronic parts of an inverter and if it exceeds a withstand voltage of the electronic parts, the electronic parts will cause insulation breakage. For this, a conventional permanent-magnet-type rotating electronic machine is designed to comply with the withstand voltage by reducing the flux amount of permanent magnets. This, however, deteriorates the output and efficiency of the motor in a low-speed zone.

According to the rotating electrical machine 20 of the embodiment, a negative d-axis current is applied at high-speed rotation, to apply a magnetizing field acting in a demagnetizing direction to the permanent magnets, thereby nearly zeroing the flux of low-coercive-force permanent magnets 3. This nearly zeroes a counter electromotive voltage generated by the low-coercive-force permanent magnets 3. At the same time, a counter electromotive voltage generated at a maximum rotation speed by the high-coercive-force permanent magnets 4 whose flux amount is not adjustable is restricted to be equal to or lower than the withstand voltage. Namely, the flux amount of only the high-coercive-force permanent magnets 4 is dropped below the withstand voltage. At low-speed rotation, the linkage flux amount of the low-coercive-force permanent magnets 3 maximally magnetized and the high-coercive-force permanent magnets 4 will be quite larger than that of the conventional permanent-magnet-type rotating electrical machine.

In this way, the permanent-magnet-type rotating electrical machine 20 according to the embodiment is capable of maintaining high output and high efficiency at low-speed rotation, suppressing a counter electromotive voltage at high-speed rotation, and improving reliability of the system including an inverter.

Third Embodiment

A permanent-magnet-type rotating electrical machine 20 according to a third embodiment of the present invention is characterized in that, with permanent magnets providing a maximum flux amount to generate maximum torque, a flux amount of high-coercive-force permanent magnets 4 is smaller than a maximum flux amount of low-coercive-force permanent magnets 3.

When the rotating electrical machine provides the maximum torque, the flux amount of the low- and high-coercive-force permanent magnets 3 and 4 of a rotor 1 is maximized to reduce a necessary current and improve efficiency. At a maximum rotation speed, a d-axis current is passed to generate a magnetizing field to nearly zero the flux amount of each low-coercive-force permanent magnet 3, thereby nearly zeroing a counter electromotive voltage caused by the low-coercive-force permanent magnets 3. At the same time, each high-coercive-force permanent magnet 4 whose flux amount is not adjustable is designed to suppress its counter electromotive voltage at the maximum rotation speed lower than a withstand voltage of electronic parts of an inverter. According to the embodiment, the flux of the high-coercive-force permanent magnets 4 is smaller than that of the low-coercive-force permanent magnets 3, to reduce a counter electromotive voltage produced by the high-coercive-force permanent magnets 4 at a given rotation speed. This enables the machine to operate at higher rotation speeds.

Fourth Embodiment

A fourth embodiment of the present invention is characterized in that, in a permanent-magnet-type rotating electrical machine 20 having a configuration similar to that illustrated in FIG. 1, a magnetic field created by a current of a stator coil is used to magnetize low-coercive-force permanent magnets 3 in such a way as to decrease a total linkage flux mount of the low- and high-coercive-force permanent magnets 3 and 4 when the voltage of the machine is close to or larger than a maximum power source voltage at high-speed rotation. According to the embodiment, the low-coercive-force permanent magnet 3 is an FeCrCo magnet or an alnico magnet and the high-coercive-force permanent magnet 4 is an NdFeB magnet.

In the permanent-magnet-type rotating electrical machine, the flux amount of the permanent magnets is constant, and therefore, a voltage generated by the linkage flux of the permanent magnets increases in proportion to the rotation speed of the rotor 1. If there is an upper limit on a power source voltage and if the rotating electrical machine must be operated in a wide range from low speed to high speed, the machine is unable to increase its rotation speed once the power source voltage reaches the upper limit. The voltage of the rotating electrical machine is determined by a coil inductance and the linkage flux of the permanent magnets, and therefore, reducing the linkage flux amount of the permanent magnets will be effective to suppress a voltage increase at high-speed rotation.

The embodiment employs, as the low-coercive-force permanent magnet 3, an FeCrCo magnet or an alnico magnet that has a low coercive force such as 60 to 200kA/m and is magnetized with a magnetic field of 200 to 300 kA/m, and as the high-coercive-force permanent magnet 4, an NdFeB magnet that has a high coercive force such as 950 kA/m and is magnetized with a magnetic field of 2400 kA/m. The low-coercive-force permanent magnet 3 can be magnetized with a magnetic field of about 1/10 of that for magnetizing the high-coercive-force permanent magnet 4. According to the embodiment, a stator coil 21 passes a pulse current for a very short time (about 100 μs to 1 ms) to form a magnetic field acting on the low-coercive-force permanent magnets 3. If the magnetizing field is of 250 kA/m, a sufficient magnetic field acts, theoretically, on the low-coercive-force permanent magnets 3. At this time, the high-coercive-force permanent magnets 4 are not irreversibly demagnetized due to the magnetization.

In an initial state, the linkage flux of the low-coercive-force permanent magnets 3 and the linkage flux of the high-coercive-force permanent magnets 4 are additional to each other, to increase the total linkage flux. When the rotating electrical machine is operated at high speed so that the voltage of the machine reaches or exceeds the maximum source voltage, a negative d-axis pulse current is passed to generate a magnetic field in a direction opposite to the magnetizing direction of the low-coercive-force permanent magnet 3 as illustrated in FIG. 5. Then, the low-coercive-force permanent magnets 3 are demagnetized or are oppositely magnetized as illustrated in FIG. 6. This results in reducing the total linkage flux of the low- and high-coercive-force permanent magnets 3 and 4. Reducing the total linkage flux amount decreases the voltage of the rotating electrical machine below the source voltage upper limit. Then, the rotation speed of the rotating electrical machine can further be increased until the source voltage reaches the upper limit.

Changing the magnitude of a d-axis current results in changing the strength of a magnetizing field and changing the magnetized state of each low-coercive-force permanent magnet 3. This results in adjusting a voltage. At this time, the low-coercive-force permanent magnets 3 are changeable among three states including a state of lowering a magnetic force, a state of zeroing the flux of the low-coercive-force permanent magnets, and a state of reversing the direction of the flux of the low-coercive-force permanent magnets.

On the other hand, the high-coercive-force permanent magnet 4 has a coercive force 10 times as large as that of the low-coercive-force permanent magnet 3 or larger. According to the embodiment, a magnetizing field acting on the high-coercive-force permanent magnet 4 is ½ of that acting on the low-coercive-force permanent magnet 3. Accordingly, a magnetic field that is sufficient to magnetize the low-coercive-force permanent magnets 3 keeps the high-coercive-force permanent magnets 4 in an irreversibly demagnetized state, so that the high-coercive-force permanent magnets can maintain the flux of the initial state even after magnetization.

When providing output, the stator coil passes a q-axis current to generate torque with a magnetic action between the q-axis current and the flux of the permanent magnets. At this time, the q-axis current generates a magnetic field. However, each low-coercive-force permanent magnet 3 is arranged in the q-axis direction and is magnetized in a direction orthogonal to the q-axis direction. Namely, the magnetizing direction of each low-coercive-force permanent magnet is orthogonal to the magnetic field created by the q-axis current. Accordingly, the influence of the magnetic field created by the q-axis current is minor.

Fifth Embodiment

A fifth embodiment of the present invention is characterized in that, when a permanent-magnet-type rotating electrical machine having a configuration similar to that illustrated in FIG. 1 is operating at low speed with the voltage thereof being lower than a maximum source voltage, each low-coercive-force permanent magnet 3 is magnetized with a magnetic field created by a current of a stator coil in such a way as to increase the linkage flux of the low- and high-coercive-force permanent magnets 3 and 4, and when the rotating electrical machine is operating at high speed with the voltage thereof being around or above the maximum source voltage, each low-coercive-force permanent magnet 3 is magnetized with a magnetic field created by a current of the stator coil in such a way as to decrease the linkage flux of the low- and high-coercive-force permanent magnets 3 and 4. The embodiment adjusts the linkage flux amount of the permanent magnets in this way.

According to the embodiment, the low-coercive-force permanent magnet 3 is an FeCrCo magnet or an alnico magnet and the high-coercive-force permanent magnet 4 is an NdFeB magnet. The FeCrCo magnet or alnico magnet used as the low-coercive-force permanent magnet 3 of the embodiment has a low coercive force such as 60 to 200 kA/m and is magnetized with a magnetic field of 200 to 300 kA/m. The NdFeB magnet used as the high-coercive-force permanent magnet 4 has a high coercive force such as 950 kA/m and is magnetized with a magnetic field of 2400 kA/m. Namely, the low-coercive-force permanent magnet 3 can be magnetized with a magnetic field of about ¹⁄₁₀ of that for magnetizing the high-coercive-force permanent magnet 4. According to the embodiment, the stator coil passes a pulse current for a very short time (about 100 μs to 1 ms) to form a magnetic field acting on the low-coercive-force permanent magnets 3. If the magnetizing field is of 250 kA/m, a sufficient magnetic field acts, theoretically, on each low-coercive-force permanent magnet 3. At this time, each high-coercive-force permanent magnet 4 is not irreversibly demagnetized due to the magnetization.

When the rotating electrical machine is operating at low speed with the voltage of the machine having a margin with respect to a maximum source voltage, a positive d-axis current is passed to generate a magnetizing field that magnetizes the low-coercive-force permanent magnets 3. The linkage flux of the low-coercive-force permanent magnets 3 is in the same direction as the linkage flux of the high-coercive force permanent magnets 4, to increase the total linkage flux. The total linkage flux of the permanent magnets and a q-axis current together generate torque. Namely, the increased linkage flux of the permanent magnets increases torque.

When the rotating electrical machine is operating at high speed with the voltage of the machine being close to or above the maximum source voltage, each low-coercive-force permanent magnet 3 is magnetized with a magnetic field created by a current of the stator coil in such a way as to decrease the linkage flux of the low- and high-coercive-force permanent magnets 3 and 4, thereby adjusting the linkage flux amount of the permanent magnets like the fourth embodiment. Reducing the linkage flux amount decreases the voltage of the rotating electrical machine below the maximum source voltage, and therefore, the machine can be operated at higher speeds until the maximum source voltage is attained.

In this way, the rotating electrical machine of the embodiment generates a magnetic field with a d-axis current serving as a magnetizing current, adjusts the linkage flux amount of each low-coercive-force permanent magnet 3 with the d-axis current, generates high torque at low speed, achieves a high-output high-speed operation, and realizes a high-output variable-speed operation in a wide range from low speed to high speed.

Sixth Embodiment

A sixth embodiment of the present invention is characterized in that a permanent-magnet-type rotating electrical machine 20 having a configuration similar to that illustrated in FIG. 1 passes a d-axis current through a stator coil 21, to form a magnetic field that adjusts the flux amount of each low-coercive-force permanent magnet 3 so that the linkage flux amount of the low- and high-coercive-force permanent magnets 3 and 4 is zeroed.

According to the embodiment, the low-coercive-force permanent magnet 3 is an FeCrCo magnet or an alnico magnet and the high-coercive-force permanent magnet 4 is an NdFeB magnet. The FeCrCo magnet or alnico magnet used as the low-coercive-force permanent magnet 3 of the embodiment has a low coercive force such as 60 to 200 kA/m and is magnetized with a magnetic field of 200 to 300 kA/m. The NdFeB magnet used as the high-coercive-force permanent magnet 4 has a high coercive force such as 950 kA/m and is magnetized with a magnetic field of 2400 kA/m. Namely, the low-coercive-force permanent magnet 3 can be magnetized with a magnetic field of about ¹⁄₁₀ of that for magnetizing the high-coercive-force permanent magnet 4.

According to the embodiment, the stator coil passes a pulse current for a very short time (about 100 μs to 1 ms) to form a magnetic field acting on the low-coercive-force permanent magnets 3. If the magnetizing field is of 250 kA/m, a sufficient magnetic field acts, theoretically, on each low-coercive-force permanent magnet 3. At this time, each high-coercive-force permanent magnet 4 is not magnetized, and when the pulse current becomes zero, reversibly changes to an original state. Namely, the linkage flux amount of the low-coercive-force permanent magnet 3 is adjusted and that of the high-coercive-force permanent magnet 4 is constant.

A d-axis current is passed to generate a magnetizing field that adjusts the flux amount of the low-coercive-force permanent magnets 3 so as to zero the linkage flux amount of the low- and high-coercive-force permanent magnets 3 and 4. Since the linkage flux of the permanent magnets is zeroed, no iron loss will occur due to the linkage flux of the permanent magnets when the rotating electrical machine is externally turned. In the case of a permanent magnet motor according to a related art applied to a system for driving a hybrid vehicle or an electric train, a voltage induced by permanent magnets at high rotation speed will break electronic parts of an inverter if the voltage exceeds a withstand voltage of the electronic parts. To keep the voltage of the motor lower than a power source voltage, the related art must always pass a field-weakening current in a high-speed zone even under no load. This deteriorates the total efficiency of the motor.

In the case of the permanent-magnet-type rotating electrical machine of the embodiment applied to a system for driving a hybrid vehicle or an electric train, it is possible to zero the linkage flux of the permanent magnets, so that a voltage induced by the permanent magnets will not break the electronic parts of an inverter and there is no need of always passing a field-weakening current in a high-speed zone under no load. Accordingly, the rotating electrical machine of the embodiment improves the reliability and efficiency of the system.

Seventh Embodiment

A seventh embodiment of the present invention is characterized in that a permanent-magnet-type rotating electrical machine 20 having a configuration similar to that illustrated in FIG. 1 equalizes, when a maximum flux amount is obtained due to magnetization with a d-axis current, a flux amount of low-coercive-force permanent magnets 3 with a flux amount of high-coercive-force permanent magnets 4.

According to the embodiment, the low-coercive-force permanent magnet 3 is an FeCrCo magnet or an alnico magnet and the high-coercive-force permanent magnet 4 is an NdFeB magnet.

The FeCrCo magnet or alnico magnet used as the low-coercive-force permanent magnet 3 of the embodiment has a low coercive force such as 60 to 200 kA/m and is magnetized with a magnetic field of 200 to 300 kA/m. The NdFeB magnet used as the high-coercive-force permanent magnet 4 has a high coercive force such as 950 kA/m and is magnetized with a magnetic field of 2400 kA/m. Namely, the low-coercive-force permanent magnet 3 can be magnetized with a magnetic field of about ¹⁄₁₀ of that for magnetizing the high-coercive-force permanent magnet 4.

According to the embodiment, a stator coil passes a pulse current for a very short time (about 100 μs to 1 ms) to form a magnetic field acting on the low-coercive-force permanent magnets 3. If the magnetizing field is of 250 kA/m, a sufficient magnetic field acts, theoretically, on each low-coercive-force permanent magnet 3. At this time, each high-coercive-force permanent magnet 4 is not magnetized, and when the pulse current becomes zero, reversibly changes to an original state. Namely, the linkage flux amount of the low-coercive-force permanent magnets 3 is adjusted and that of the high-coercive-force permanent magnets 4 is unchanged.

As explained in the sixth embodiment, zeroing the linkage flux amount of the permanent magnets improves the reliability and efficiency of a system that employs the rotating electrical machine. For this, a d-axis current is passed to generate a magnetizing field that adjusts the flux amount of the low-coercive-force permanent magnets 3 so that the linkage flux amount of the low- and high-coercive-force permanent magnets 3 and 4 is zeroed.

The seventh embodiment equalizes a flux amount of the low-coercive-force permanent magnets 3 with a flux amount of the high-coercive-force permanent magnets 4. The magnetizing direction of each low-coercive-force permanent magnet 3 is set to generate linkage flux in an opposite direction to linkage flux of each high-coercive-force permanent magnet 4 and the low-coercive-force permanent magnet 3 is completely magnetized with a magnetizing field of 250 kA/m or over. Namely, only by creating a magnetizing field of 250 kA/m or over, the total linkage flux amount of the permanent magnets can surely and easily be zeroed without regard to fluctuations in a magnetizing current and ambient conditions such as temperature.

Eighth Embodiment

Figure 7:
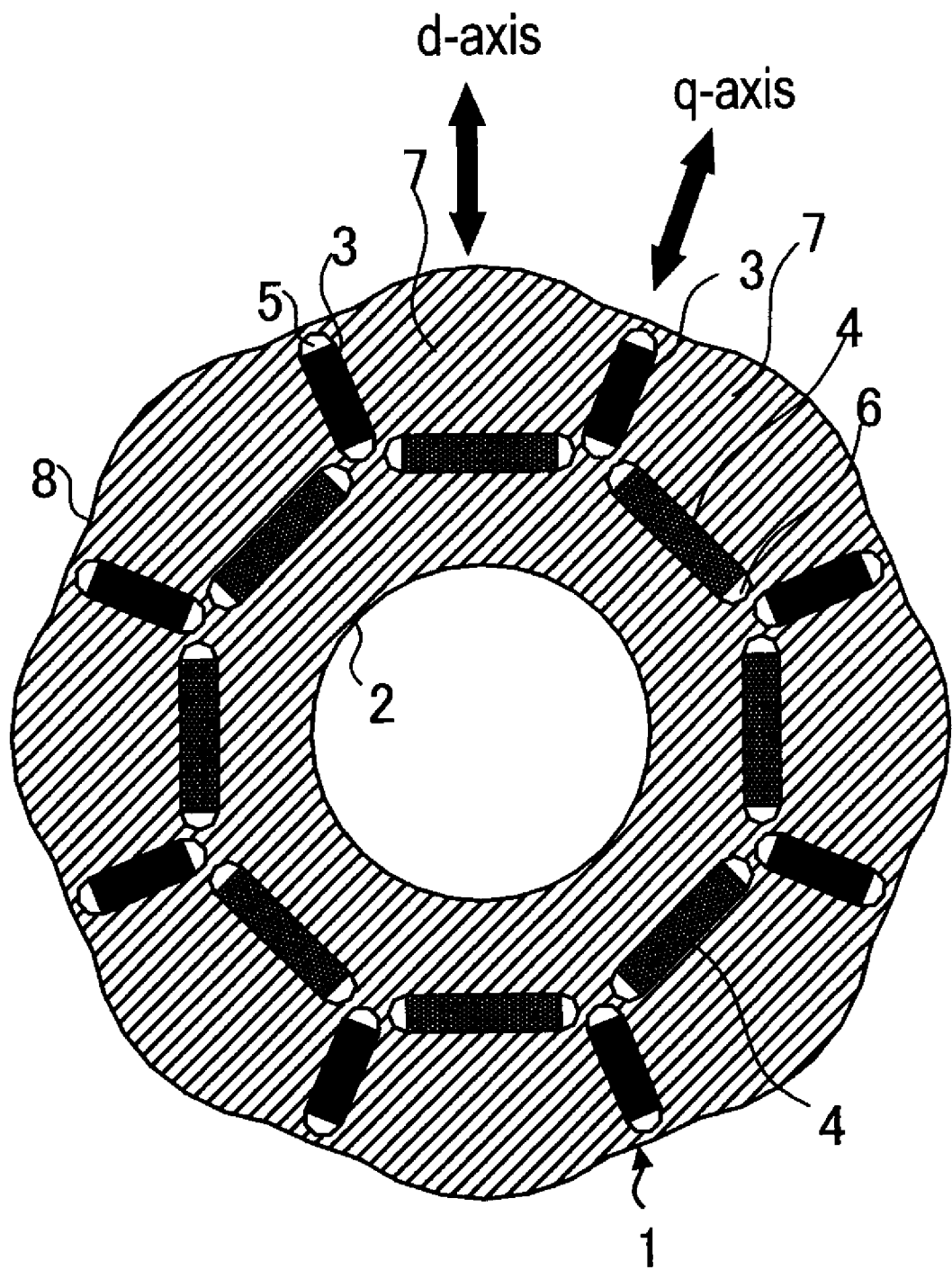
FIG. 7 is a sectional view illustrating a rotor of a permanent-magnet-type rotating electrical machine according to an eighth embodiment of the present invention.

FIG. 7 is a sectional view illustrating a rotor 1 of a permanent-magnet-type rotating electrical machine according to an eighth embodiment of the present invention. The same or equal elements as those of FIG. 2 are illustrated with the same reference marks. The rotor 1 illustrated in FIG. 7 has a rotor core 2 in which low-coercive-force permanent magnets 3 and high-coercive-force permanent magnets 4 are embedded at equal pitches. Except for a part around an end of each low-coercive-force permanent magnet 3, the rotor core 2 on an air gap side is recessed in the vicinity of the end of each low-coercive-force permanent magnet 3 from an outermost circumference of the rotor core 2, to form a recess B. In the rotor core 2, each end of the part where the low-coercive-force permanent magnet 3 is embedded is provided with a first hollow 5 and each end of the part where the high-coercive-force permanent magnet 4 is embedded is provided with a second hollow 6. "7" indicates a magnetic pole portion of the rotor core 2.

Action of the rotor 1 of the embodiment will be explained. The permanent-magnet-type rotating electrical machine 20 employing the rotor 1 is configured like that illustrated in FIG. 1. In such a rotating electrical machine 20, flux (d-axis flux) created by a d-axis current crosses the low- and high-coercive-force permanent magnets 3 and 4. The magnetic permeability of the permanent magnets is substantially equal to that of air, and therefore, a d-axis inductance is small. On the other hand, flux in a q-axis direction passes through the pole portion 7 of the rotor core 2 along the low- and high-coercive-force permanent magnets 3 and 4. The magnetic permeability of the pole portion 7 of the rotor core 2 is 1000 to 10000 times as large as that of the permanent magnets. If the q-axis part of the rotor core 2 has no recess and if the outer diameter of the rotor core 2 is circumferentially uniform, a q-axis inductance will be large. A q-axis current is passed to generate torque with magnetic action of the current and flux. At this time, the large q-axis inductance increases a voltage generated by the q-axis current, thereby deteriorating a power factor.

To cope with this, the embodiment forms the recess 8 on the outermost circumference of the rotor core 2 around an end of each low-coercive-force permanent magnet 3 on the air gap side, to reduce flux passing through the recesses 8 of the rotor core 2. Since the recess 8 is in the q-axis direction, the q-axis inductance is reduced to improve a power factor. Each recess 8 equivalently elongates an air gap length around each end of the low-coercive-force permanent magnet 3, to lower an average magnetic field around the end of the low-coercive-force permanent magnet 3. This results in reducing the influence of a demagnetizing field on the low-coercive-force permanent magnet 3 due to the q-axis current for generating torque.

A part of the rotor core that is at an end of each low-coercive-force permanent magnet 3 and supports the permanent magnet is not recessed, and therefore, the diametrical length of the low-coercive-force permanent magnet 3 can be extended as long as possible, so that the volume of the permanent magnet is secured compared to a rotor having the same diameter. Namely, the embodiment can increase the flux amount of the permanent magnets and increase output per rotor volume.

Ninth Embodiment

Figure 8:
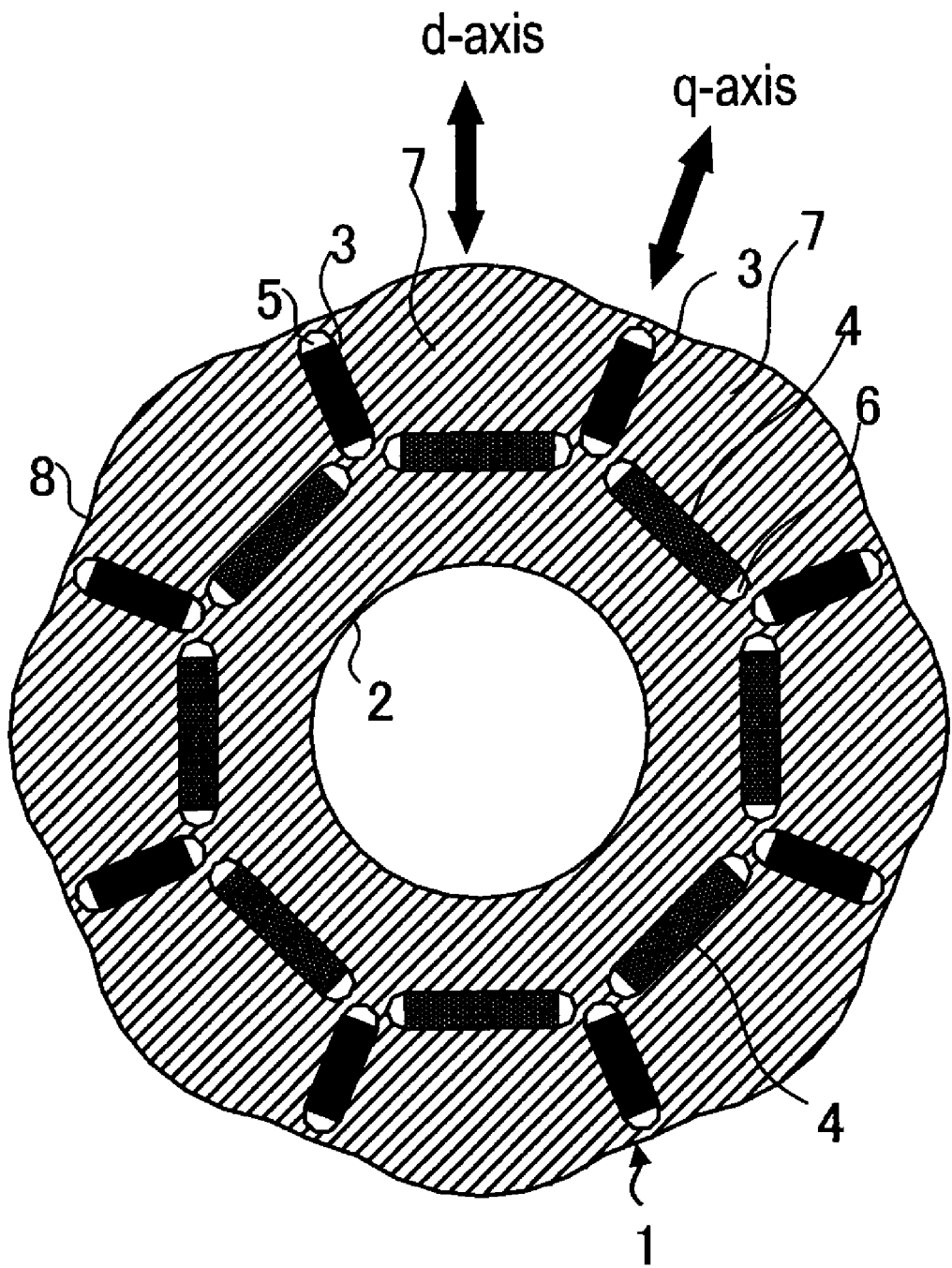
FIG. 8 is a sectional view illustrating a rotor of a permanent-magnet-type rotating electrical machine according to a ninth embodiment of the present invention.

FIG. 8 is a sectional view illustrating a rotor 1 of a permanent-magnet-type rotating electrical machine according to a ninth embodiment of the present invention. The same or equal elements as those of FIGS. 2 and 7 are illustrated with the same reference marks. In FIG. 8, the rotor 1 has a rotor core 2 in which low-coercive-force permanent magnets 3 and high-coercive-force permanent magnets 4 are embedded at equal pitches. Each end of the low-coercive-force permanent magnet 3 is provided with a first hollow 5 and each end of the high-coercive-force permanent magnet 4 is provided with a second hollow 6. "7" indicates a magnetic pole portion of the rotor core 2.

The low-coercive-force permanent magnet 3 is arranged in a radial direction on a q-axis serving as a center axis of an inter-polar part between adjacent pole portions 7. Between an end of the low-coercive-force permanent magnet 3 and the middle of the magnetic pole portion 7 of the rotor core 2, the middle of the magnetic pole portion 7 of the rotor core 2 defines an outermost circumferential part of the rotor 1. From the middle of the magnetic pole portion 7 toward the outer circumference of the rotor core at the end of the low-coercive-force permanent magnet 3, the distance between an axial center of the rotor 1 and the outer circumference of the rotor core 2 is gradually shortened, to form the recess 8.

Action of the rotor 1 having the above-mentioned configuration will be explained. The permanent-magnet-type rotating electrical machine 20 employing the rotor 1 is the same as that illustrated in FIG. 1. In the rotating electrical machine 20, flux (d-axis flux) created by a d-axis current crosses the low- and high-coercive-force permanent magnets 3 and 4 of the rotor 1. The magnetic permeability of the permanent magnets is substantially equal to that of air, and therefore, a d-axis inductance is small. On the other hand, flux in a q-axis direction passes through the pole portion 7 of the rotor core along the low- and high-coercive-force permanent magnets 3 and 4.

The magnetic permeability of the pole portion 7 is 1000 to 10000 times as large as that of the magnets. If the rotor core 2 has no recess 8 in the q-axis direction and if the outer diameter of the rotor core is circumferentially uniform, a q-axis inductance will be large. A q-axis current is passed to generate torque with magnetic action of the current and flux. At this time, the large q-axis inductance increases a voltage generated by the q-axis current. Therefore, if the rotor core has no recess 8 in the q-axis direction and if the outer diameter of the rotor core is circumferentially uniform, the large q-axis inductance deteriorates a power factor.

To cope with this, the embodiment gradually shortens the distance between the axial center of the rotor 1 and the outer circumference of the rotor core 2 from the middle of the outer circumference of the pole portion 7 toward the outer circumference of the rotor core at the end of the low-coercive-force permanent magnet 3. In the permanent-magnet-type rotating electrical machine employing the rotor 1, each recess 8 on the rotor core on the air gap side gradually deepens from the middle of the pole portion 7 toward the end of the low-coercive-force permanent magnet 3. The recess 8 of this shape elongates an air gap length, to reduce flux passing through the recess 8 as the recess 8 deepens. Since the recess 8 is in the q-axis direction, it can reduce the q-axis inductance. Reducing the q-axis inductance results in improving a power factor. The recess is deepest around the end of the low-coercive-force permanent magnet 3 that is on the q-axis, to effectively reduce the q-axis inductance.

Due to the recess 8, the air gap length of the rotating electrical machine 20 becomes longest at the end of the low-coercive-force permanent magnet 3, and therefore, a magnetic field around the end of the low-coercive-force permanent magnet 3 decreases. This reduces the influence of a q-axis current used for generating torque on a demagnetizing field that acts on the low-coercive-force permanent magnet.

Tenth Embodiment

Figure 9:
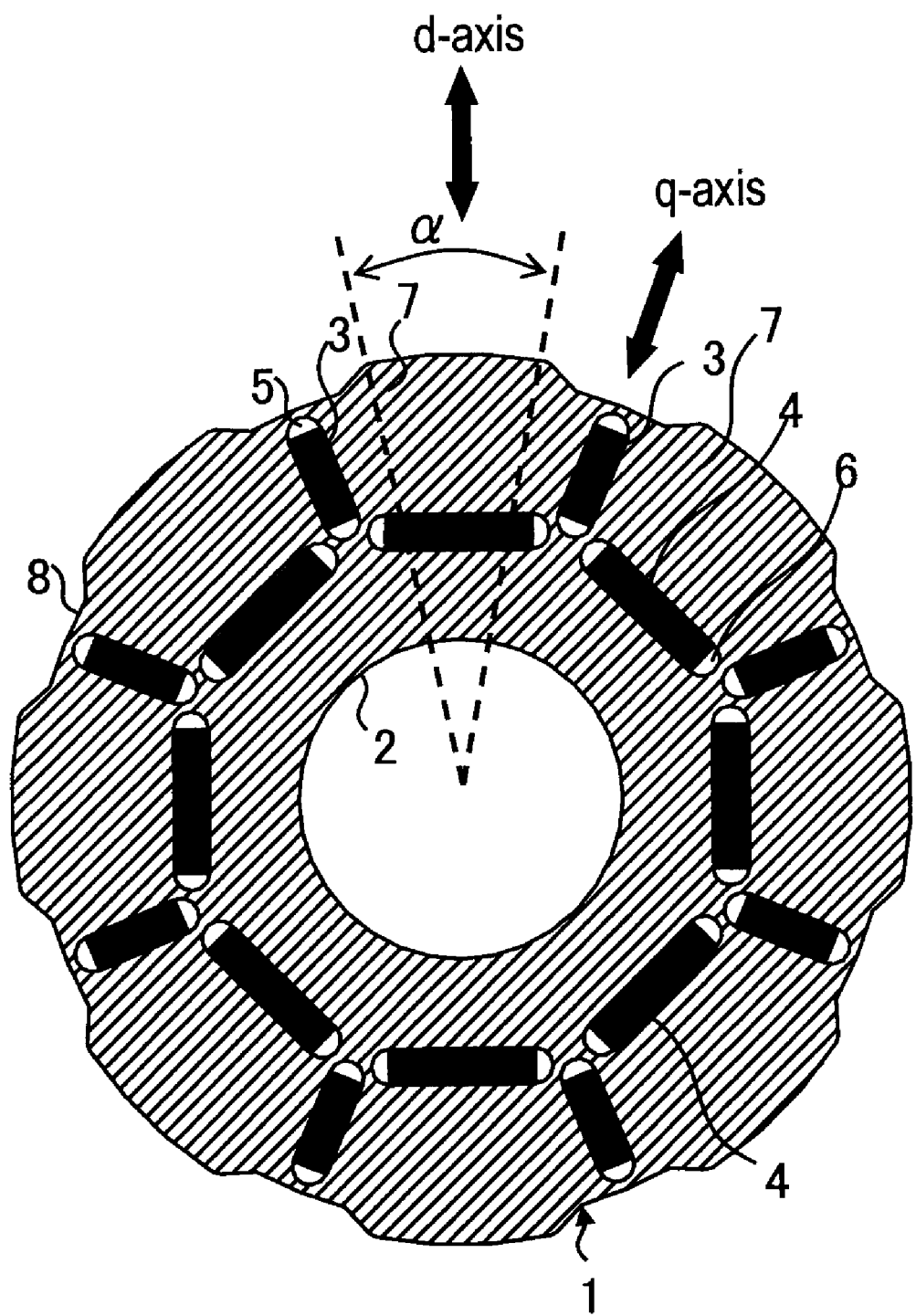
FIG. 9 is a sectional view illustrating a rotor of a permanent-magnet-type rotating electrical machine according to a tenth embodiment of the present invention.

FIG. 9 is a sectional view illustrating a rotor 1 of a permanent-magnet-type rotating electrical machine according to a tenth embodiment of the present invention. The same or equivalent elements as those of FIGS. 2, 7, and 8 are illustrated with the same reference marks. In FIG. 9, the rotor 1 has a rotor core 2 in which low-coercive-force permanent magnets 3 and high-coercive-force permanent magnets 4 are embedded at equal pitches. Each end of the low-coercive-force permanent magnet 3 is provided with a first hollow 5 and each end of the high-coercive-force permanent magnet 4 is provided with a second hollow 6. A part of the rotor core 2 corresponding to an outer end of the low-coercive-force permanent magnet 3 is recessed to form a recess 8. "7" indicates a magnetic pole portion of the rotor core 2. "$\alpha$" is a central angle of a circular arc at a middle of the magnetic pole portion 7 of the rotor core 2.

The middle of the magnetic pole portion 7 of the rotor core 2 is formed with the circular arc defined with a maximum radius of the rotor 1 (the maximum length from the central axis of the rotor to the outer circumference of the rotor). The central angle $\alpha$ of the circular arc at the middle of the pole portion is within a range of 90 to 140 degrees in electrical angle. In an area outside the central angle $\alpha$ of the rotor core 2, the recess 8 is formed by recessing the outer circumference of the rotor core 2 from the circular arc having the maximum radius toward an inner circumferential side.

The permanent-magnet-type rotating electrical machine 20 employing the rotor 1 has substantially the same configuration as that illustrated in FIG. 1. When the rotating electrical machine 20 is operated in low- and middle-speed zones with the voltage thereof being below a maximum source voltage, the flux of the permanent magnets is maximally used to improve efficiency. According to the embodiment, the middle of the magnetic pole portion 7 of the rotor core 2 defined by the central angle $\alpha$ is formed with the circular arc having the maximum radius of the rotor 1, and therefore, an air gap length around a d-axis, which is present at this location, is shortest. Accordingly, the middle part having the central angle $\alpha$ around the d-axis involves a large linkage flux amount of the high- and low-coercive-force permanent magnets 4 and 3.

Around a q-axis along which the low-coercive-force permanent magnet 3 is arranged, the outer circumference of the rotor core 2 is recessed inwardly from the circular arc having the maximum radius of the rotor 1. As a result, a magnetic field produced by a q-axis current is weak. When a q-axis current is passed to generate torque, this configuration prevents each low-coercive-force permanent magnet 3 from demagnetizing due to a magnetic field created by the q-axis current.

With the above-mentioned configuration, the permanent-magnet-type rotating electrical machine 20 employing the rotor 1 of the embodiment increases the flux amount of the permanent magnets around the d-axis, to secure high output and high torque. At the same time, the machine greatly reduces the influence of a q-axis current on the demagnetization of the low-coercive-force permanent magnets 3.

Figure 10:
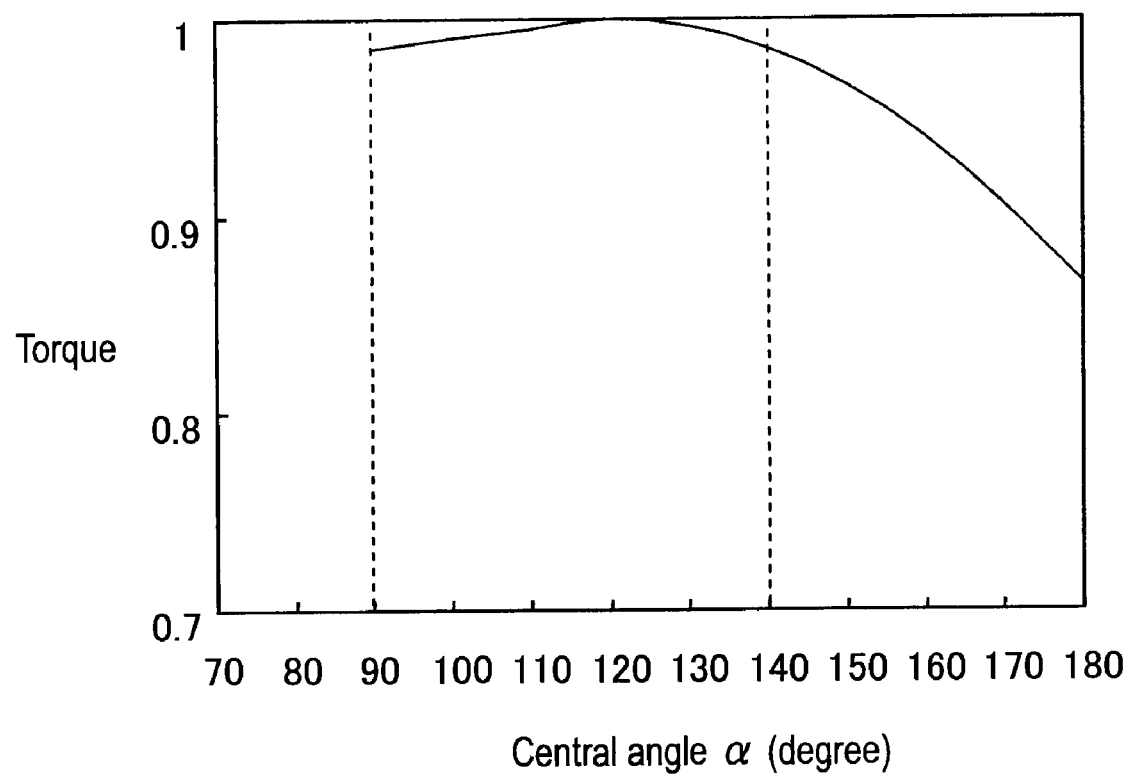
FIG. 10 is a view illustrating a torque change with respect to a pole central angle α according to the tenth embodiment of the present invention.

FIG. 10 is a view illustrating changes in torque with respect to the central angle $\alpha$ of the permanent-magnet-type rotating electrical machine according to the embodiment. It is understood that, when the central angle $\alpha$ of the circular arc at the middle of the pole portion is in the range of 90 to 140 degrees in electrical angle, large torque is obtained.

Eleventh Embodiment

A permanent-magnet-type rotating electrical machine according to an eleventh embodiment of the present invention will be explained. The permanent-magnet-type rotating electrical machine of the embodiment is characterized in that, based on the permanent-magnet-type rotating electrical machine 20 of the first embodiment illustrated in FIGS. 1 and 2, the magnetizing direction thickness of the low-coercive-force permanent magnet 3 embedded in the rotor core 2 of the rotor 1 is thinner than the magnetizing direction thickness of the high-coercive-force permanent magnet 4. The strength of a magnetic field for magnetizing a permanent magnet is substantially proportional to the magnetizing direction thickness of the permanent magnet. Accordingly, thinning the magnetizing direction thickness of the low-coercive-force permanent magnet 3 than the magnetizing direction thickness of the high-coercive-force permanent magnet 4 results in lowering a magnetic field necessary for magnetizing the low-coercive-force permanent magnet 3 and reducing a magnetizing current for the same.

Generally, a temperature characteristic of the high-coercive-force permanent magnet 4 deteriorates as a magnetic energy product increases, and at a high temperature over 100° C., the coercive force thereof drops so that the permanent magnet is irreversibly demagnetized with a smaller demagnetizing field. To cope with this, the embodiment decrease a magnetic field for magnetizing the low-coercive-force permanent magnet 3, to prevent the high-coercive-force permanent magnet 4 from being irreversibly demagnetized when a magnetizing field is applied to the permanent magnets in a high-temperature state.

Twelfth Embodiment

Figure 11:
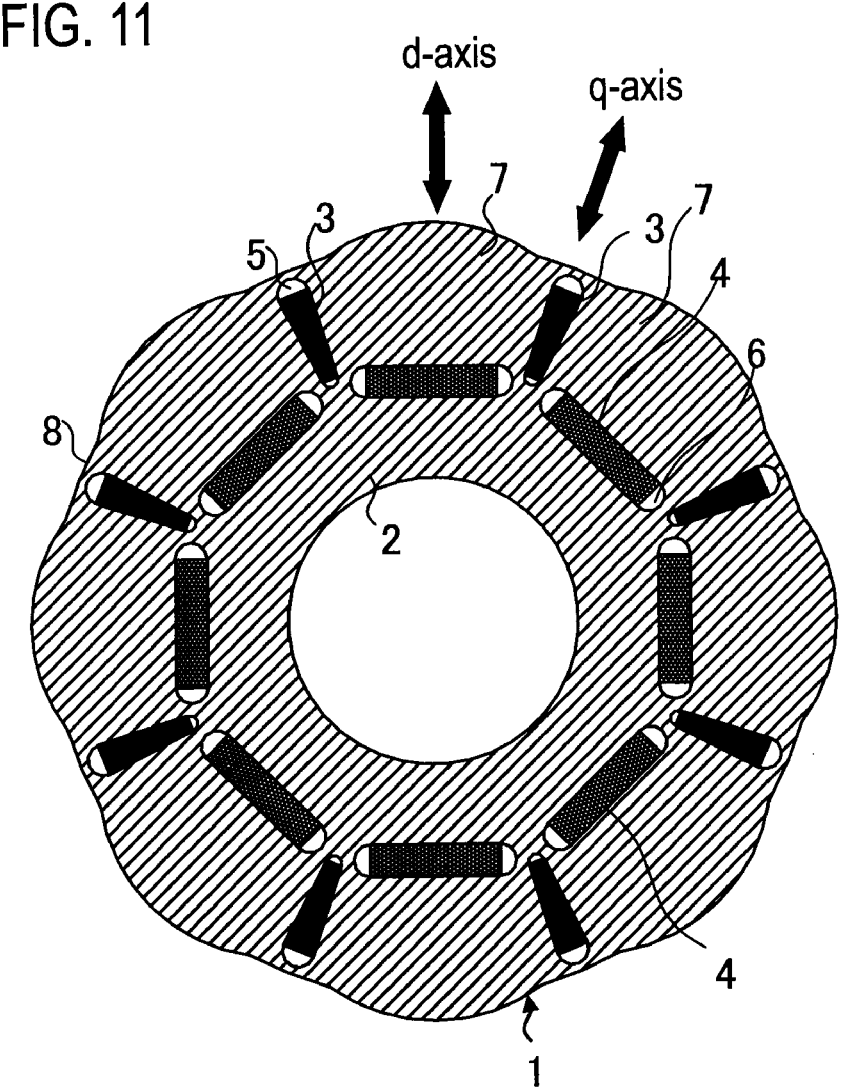
FIG. 11 is a sectional view illustrating a rotor of a permanent-magnet-type rotating electrical machine according to a twelfth embodiment of the present invention.

FIG. 11 is a sectional view illustrating a rotor 1 of a permanent-magnet-type rotating electrical machine according to a twelfth embodiment of the present invention. The same or equivalent parts as those of FIGS. 2 and 7 to 9 are illustrated with the same reference marks. In FIG. 11, the rotor 1 has a rotor care 2 in which low-coercive-force permanent magnets 3 and high-coercive-force permanent magnets 4 are embedded at equal pitches. Each end of the low-coercive-force permanent magnet 3 is provided with a first hollow 5 and each end of the high-coercive-force permanent magnet 4 is provided with a second hollow 6. A part of the rotor core 2 corresponding to an outer end of the low-coercive-force permanent magnet 3 is recessed to form a recess 8. "7" indicates a magnetic pole portion of the rotor core 2. In the rotor 1 of the embodiment, the magnetizing direction thickness of the low-coercive-force permanent magnet 3 is not uniform but gradually increases toward the outer circumferential side of the rotor 1.

When a magnetizing field is applied to the low-coercive-force permanent magnet 3, the magnetizing field acting on the low-coercive-force permanent magnet 3 in the rotor 1 is not uniformly distributed but the strength thereof in the permanent magnet is biased. If the magnetic field is biased to a specific part, adjusting the flux amount of the low-coercive-force permanent magnet 3 with a magnetizing current will be difficult. Fluctuations in the magnetizing field or temperature during operation also affect the flux amount of the permanent magnet. Then, it will be difficult for the permanent magnet to secure the reproducibility of a flux amount at the time of magnetization. To deal with this, the embodiment utilizes the characteristic of a permanent magnet that a magnetizing force necessary for magnetizing the permanent magnet largely depends on the magnetizing direction thickness of the permanent magnet.

According to the rotor 1 of the embodiment, the magnetizing direction thickness of the low-coercive-force permanent magnet 3 is not uniform but varies. When a magnetizing field is applied, the permanent magnet provides different flux amounts depending on the thicknesses thereof. Namely, the strength of a magnetizing field becomes largely dependent on the thickness of the permanent magnet. This configuration reduces the influence of external conditions such as magnetic field concentration and deviation and magnetizing field fluctuations, makes it easy to adjust a flux amount with a magnetizing current, and minimizes flux fluctuations due to external conditions.

Figure 12:
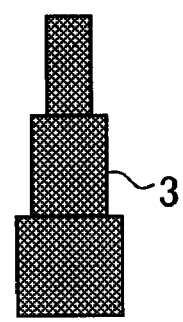
FIG. 12 is a longitudinal sectional view illustrating a low-coercive-force permanent magnet according to the twelfth embodiment of the present invention.

FIG. 12 is a longitudinal section illustrating the low-coercive-force permanent magnet 3 adopted by the embodiment. In FIG. 12, the magnetizing direction thickness of the low-coercive-force permanent magnet 3 changes in stepwise. This shape increases the flux amount of the permanent magnet in stepwise according to the thicknesses of the permanent magnet. The influence of the thicknesses of the permanent magnet on the flux amount thereof is quite larger than the influence of disturbances or external conditions on the same. As a result, when the low-coercive-force permanent magnet 3 is magnetized to change the flux amount thereof, fluctuations in the flux amount caused by fluctuations in the magnetizing field are reduced, to improve the reproducibility of the flux amount of the low-coercive-force permanent magnet 3 with respect to the same magnetizing current.

Thirteenth Embodiment

Figure 13:
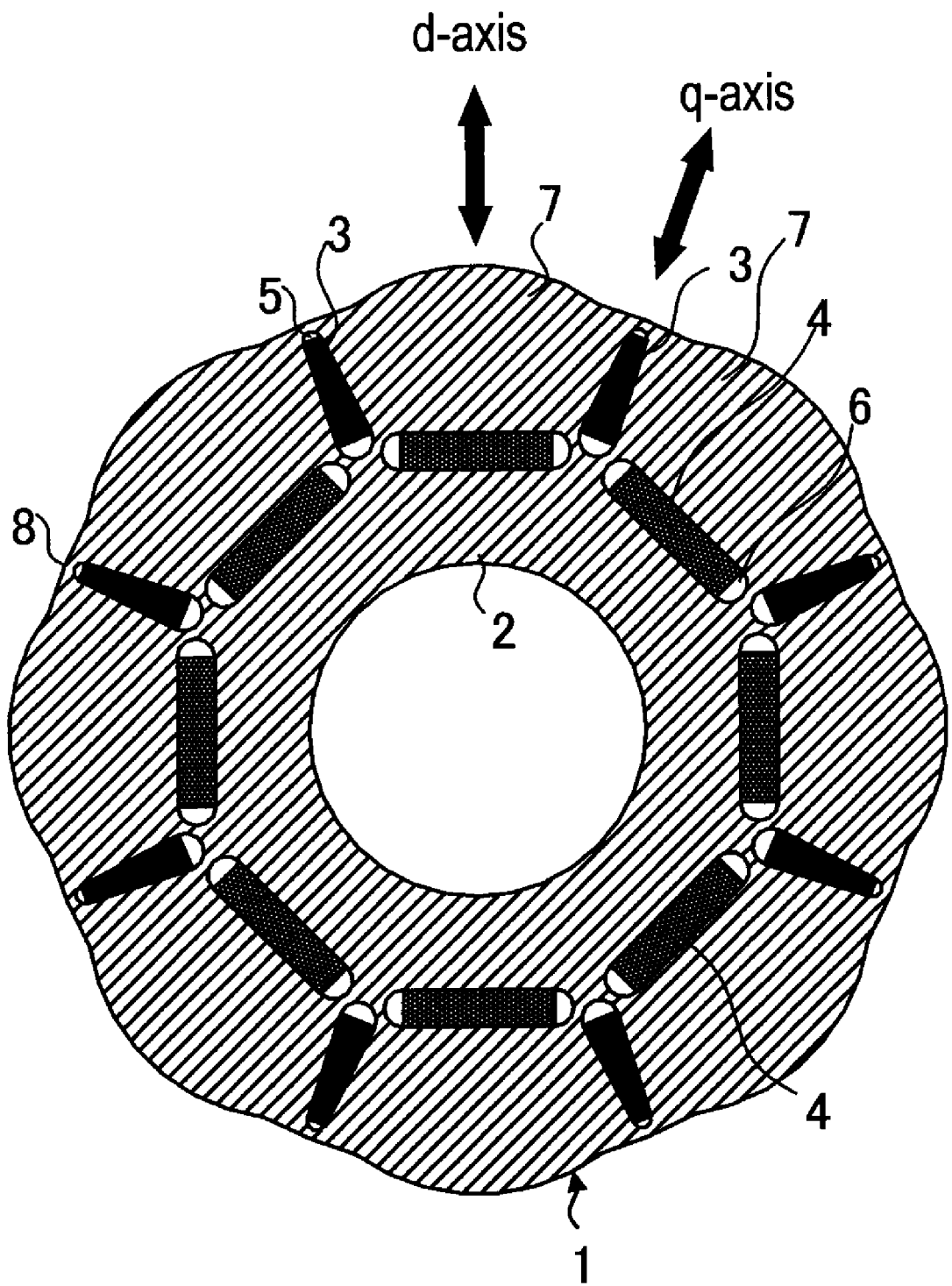
FIG. 13 is a sectional view illustrating a rotor of a permanent-magnet-type rotating electrical machine according to a thirteenth embodiment of the present invention.

FIG. 13 is a sectional view illustrating a rotor 1 of a permanent-magnet-type rotating electrical machine according to a thirteenth embodiment of the present invention. The same or equivalent parts as those of FIGS. 2, 7 to 9, and 11 are illustrated with the same reference marks. In FIG. 13, the rotor 1 has a rotor core 2 in which low-coercive-force permanent magnets 3 and high-coercive-force permanent magnets 4 are embedded at equal pitches. Each end of the low-coercive-force permanent magnet 3 is provided with a first hollow 5 and each end of the high-coercive-force permanent magnet 4 is provided with a second hollow 6. A part of the rotor core 2 corresponding to an outer end of the low-coercive-force permanent magnet 3 is recessed to form a recess 8. "7" indicates a magnetic pole portion of the rotor core 2.

This embodiment is characterized in that the low-coercive-force permanent magnet 3 has a tapered shape so that the magnetizing direction thickness of the permanent magnet 3 gradually becomes thinner toward the outer circumferential side of the rotor 1. Thinning the thickness of the low-coercive-force permanent magnet 3 toward the outer circumferential side of the rotor 1 makes a face of the rotor core that is in contact with the low-coercive-force permanent magnet 3 receive a centrifugal force of the low-coercive-force permanent magnet 3, so that the rotor core 2 firmly holds the low-coercive-force permanent magnet 3. Even if a dimensional accuracy of the magnetic direction thickness of the low-coercive-force permanent magnet 3 is rough, the low-coercive-force permanent magnet 3 gets in contact with the rotor core 2 at a diametrical position corresponding to the dimensional accuracy and is fixed thereto. The embodiment is achievable with a molding technique to mass-produce the low-coercive-force permanent magnets with a mold.

In addition to the effects of surely holding the low-coercive-force permanent magnets 3 and mass-producing the permanent magnets, the embodiment provides the following actions and effects. If the thickness of the low-coercive-force permanent magnet 3 is uniform, there will be a problem that a magnetizing field of the low-coercive-force permanent magnet 3 fluctuates to sharply and partly change the flux amount of the low-coercive-force permanent magnet. A magnetizing field of a permanent magnet is greatly dependent on the thickness of the permanent magnet. When a permanent magnet is magnetized, the flux amount of a part of the permanent magnet is greatly dependent on the thickness of the part. For this, the embodiment provides the low-coercive-force permanent magnet 3 with different thicknesses, so that the flux amount thereof may greatly change depending on the partial thicknesses of the permanent magnet. Namely, the strength of a magnetic field that determines the flux of the permanent magnet is dependent on the thickness of the permanent magnet. The embodiment can secure a wide variation width for a magnetizing field with respect to a variation width of the flux amount of the low-coercive-force permanent magnet 3. Namely, by adjusting a magnetizing current in the rotating electrical machine, the embodiment can easily adjust the flux amount of an optional permanent magnet, to minimize fluctuations in the flux amount of the low-coercive-force permanent magnet after repetition of magnetization (good reproducibility) and narrow the range of fluctuation of the flux amount of the permanent magnet with respect to fluctuations in a magnetizing current and ambient conditions such as temperature.

Fourteenth Embodiment

Figure 14:
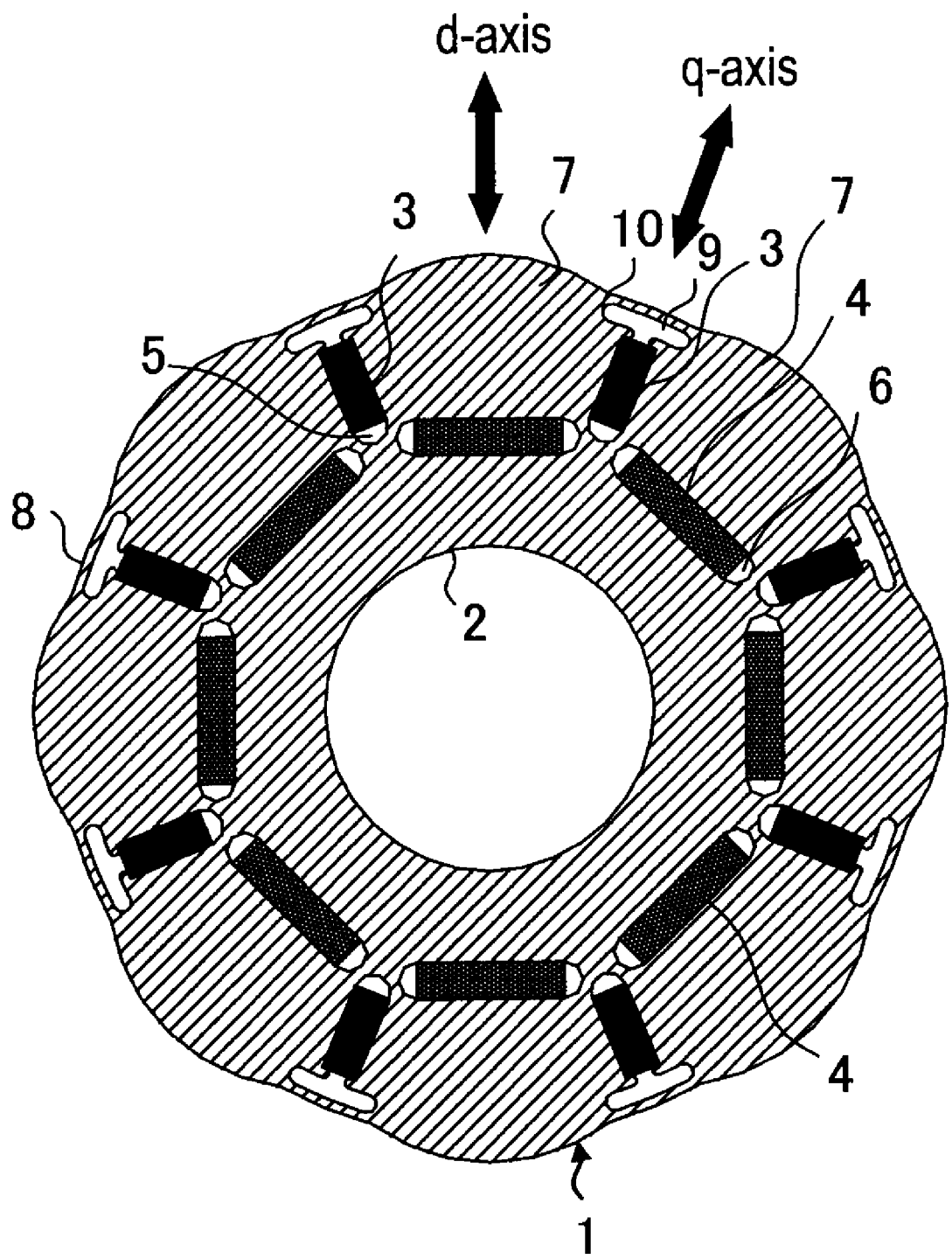
FIG. 14 is a sectional view illustrating a rotor of a permanent-magnet-type rotating electrical machine according to a fourteenth embodiment of the present invention.

FIG. 14 is a sectional view illustrating a rotor 1 of a permanent-magnet-type rotating electrical machine according to a fourteenth embodiment of the present invention. The same or equivalent parts as those of FIGS. 2, 7 to 9, 11, and 13 are illustrated with the same reference marks. In FIG. 14, the rotor 1 has a rotor core 2 in which low-coercive-force permanent magnets 3 and high-coercive-force permanent magnets 4 are embedded at equal pitches. An inner end of the lowcoercive-force permanent magnet 3 is provided with a first hollow 5 and each end of the high-coercive-force permanent magnet 4 is provided with a second hollow 6. A part of the rotor core 2 corresponding to an outer end of the low-coercive-force permanent magnet 3 is recessed to form a recess 8. "7" indicates a magnetic pole portion of the rotor core 2, "9" a magnetic barrier, and "10" a projection.

The rotor 1 of the embodiment has the magnetic barrier 9 formed in the rotor core 2 around an air-gap-side end of the low-coercive-force permanent magnet 3, the magnetic barrier being circumferentially longer than the magnetizing direction thickness of the low-coercive-force permanent magnet 3. The magnetic barrier 9 is a hole where air is present. On the outer-circumferential-side (air-gap-side) end of the low-coercive-force permanent magnet 3, there is the projection 10. The projection 10 receives a centrifugal force of the low-coercive-force permanent magnet 3 and holds the permanent magnet.

The rotor 1 of the embodiment is assembled in the permanent-magnet-type rotating electrical machine 20 like the first embodiment of FIG. 1. To generate torque for the permanent-magnet-type rotating electrical machine 20, a q-axis current is passed. The q-axis current generates a magnetic field on the low-coercive-force permanent magnet 3 of the rotor 1 on the q-axis. According to the rotor 1 of the embodiment, the magnetic barrier 9 is arranged adjacent to an end of the low-coercive-force permanent magnet 3, and therefore, the air layer of the magnetic barrier 9 reduces the magnetic field created by the q-axis current and acting on the end of the low-coercive-force permanent magnet 3. This suppresses the demagnetization and magnetization of the low-coercive-force permanent magnet 3 due to the q-axis current. The magnetic barrier 9 is circumferentially longer than the magnetizing direction thickness of the low-coercive-force permanent magnet 3, and therefore, it can relax the magnetic field created by the q-axis current and concentrating to the end corners of the low-coercive-force permanent magnet 3. This prevents the demagnetization and magnetization of the low-coercive-force permanent magnet 3 due to the magnetic field created by the q-axis current and sneaking around the permanent magnet. The magnetic barrier 9 is long in the circumferential direction of the rotor around the q-axis, to increase magnetic resistance in the q-axis direction and reduce a flux amount due to the q-axis current. This results in reducing a q-axis inductance and improving a power factor.

Fifteenth Embodiment

Figure 15:
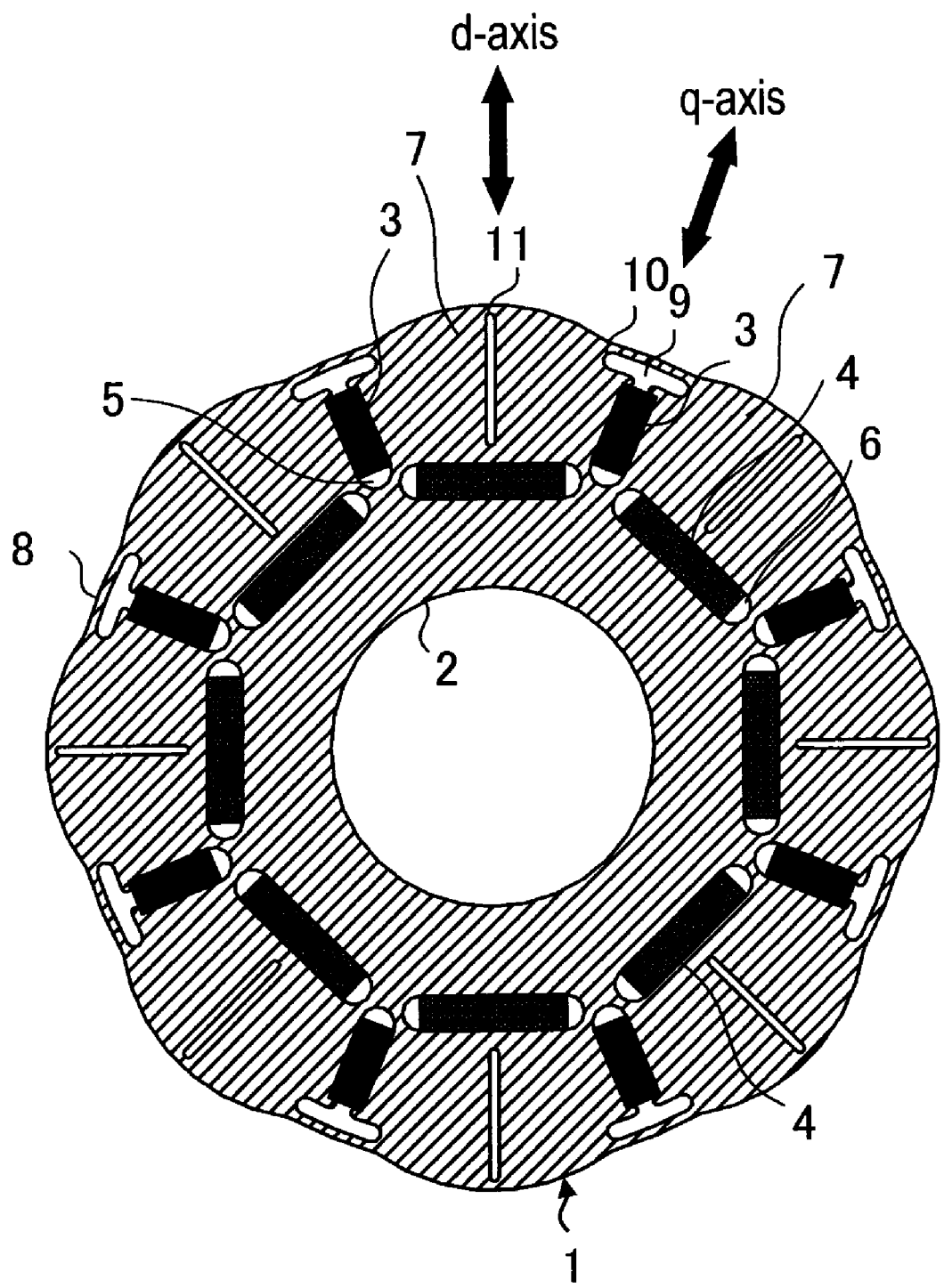
FIG. 15 is a sectional view illustrating a rotor of a permanent-magnet-type rotating electrical machine according to a fifteenth embodiment of the present invention.

FIG. 15 is a sectional view showing a rotor 1 of a permanent-magnet-type rotating electrical machine according to a fifteenth embodiment of the present invention. The same or equivalent parts as those of FIGS. 2, 7 to 9, 11, 13, and 14 are illustrated with the same reference marks. In FIG. 15, the rotor 1 has a rotor core 2 in which low-coercive-force permanent magnets 3 and high-coercive-force permanent magnets 4 are embedded at equal pitches. An inner end of the low-coercive-force permanent magnet 3 is provided with a first hollow 5 and each end of the high-coercive-force permanent magnet 4 is provided with a second hollow 6. A part of the rotor core 2 corresponding to an outer end of the low-coercive-force permanent magnet 3 is recessed to form a recess 8. In FIG. 15, "7" indicates a magnetic pole portion of the rotor core 2, "9" a magnetic barrier, and "10" a projection. This embodiment is characterized in that a slit 11 is arranged at a position agreeing with a d-axis that is a center axis of a pole portion 7 of the rotor core 2 between adjacent low-coercive-force permanent magnets 3.

The slit 11 is on the d-axis, and therefore, does not form a magnetic barrier against d-axis flux but it serves as a magnetic barrier against q-axis flux. Namely, the slit gives little influence on the flux of permanent magnets distributed around the d-axis and reduces q-axis flux. Accordingly, the permanent-magnet-type rotating electrical machine 20 employing the rotor 1 of the embodiment can maintain torque generated by the permanent magnets and improve a power factor.

Sixteenth Embodiment

Figure 16A:
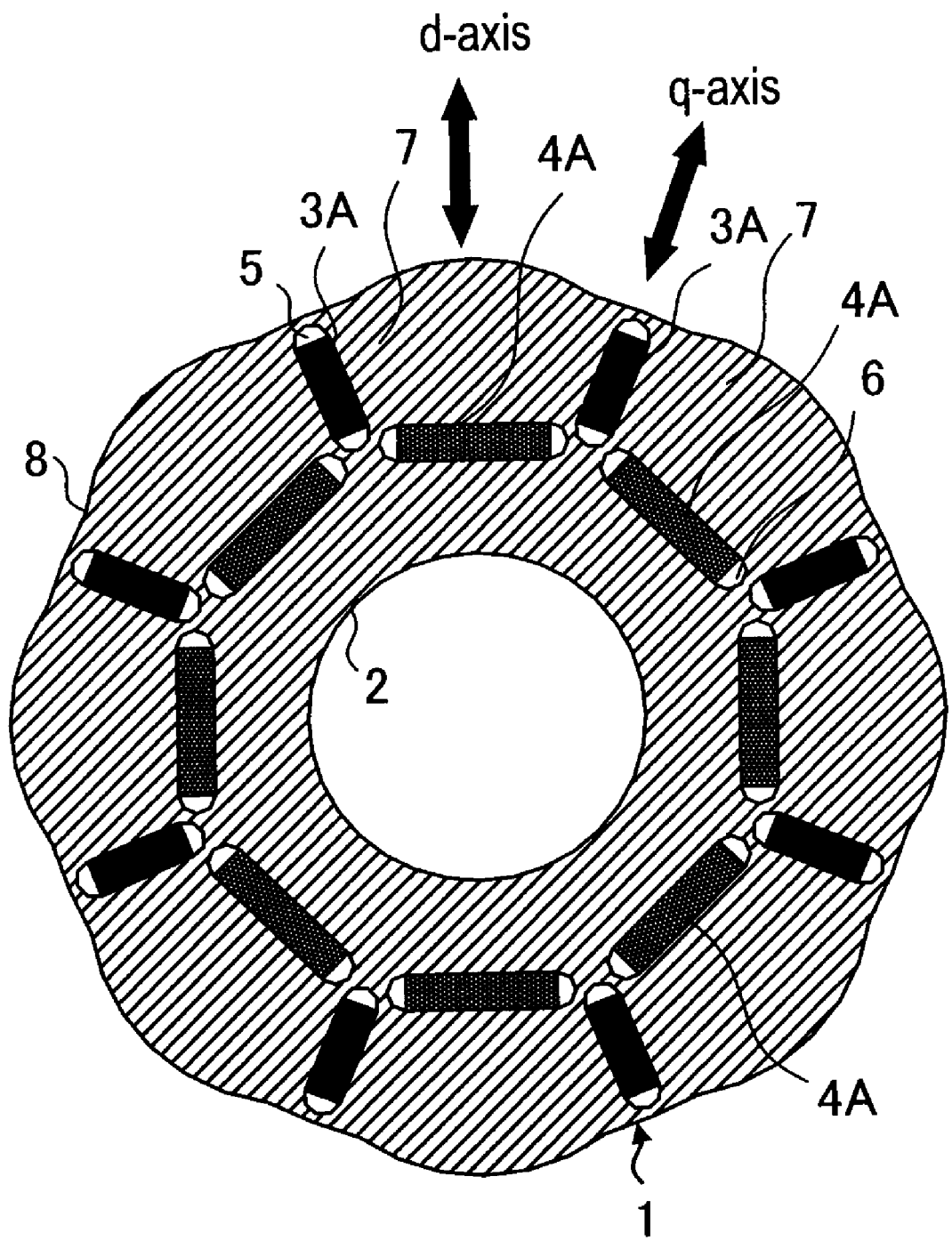
FIG. 16A is a sectional view illustrating a rotor of a permanent-magnet-type rotating electrical machine according to a sixteenth embodiment of the present invention.
Figure 16B:
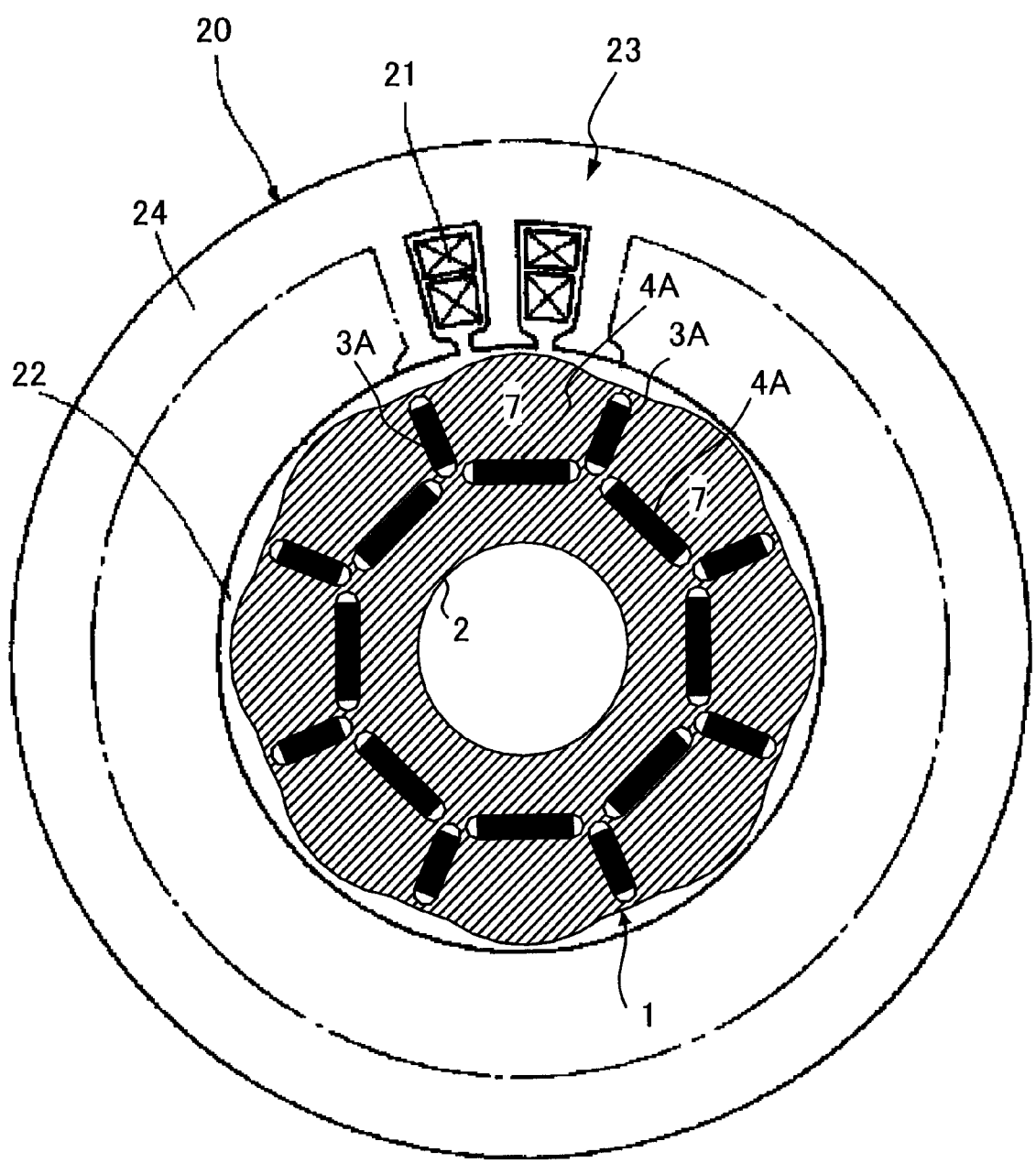
FIG. 16B is a sectional view illustrating the permanent-magnet-type rotating electrical machine according to the sixteenth embodiment of the present invention.

FIGS. 16A and 16B are sectional views illustrating a rotor 1 and permanent-magnet-type rotating electrical machine 20 according to a sixteenth embodiment of the present invention. The same or equivalent parts as those of FIGS. 2, 7 to 9, 11, and 13 to 15 are illustrated with the same reference marks. In FIG. 16A, the rotor 1 has a rotor core 2 in which low-coercive-force permanent magnets 4A and high-coercive-force permanent magnets 3A are embedded at equal pitches. Each end of the high-coercive-force permanent magnet 3A is provided with a first hollow 5 and each end of the low-coercive-force permanent magnet 4A is provided with a second hollow 6. A part of the rotor core 2 corresponding to an outer end of the high-coercive-force permanent magnet 3A is recessed to form a recess 8. "7" indicates a magnetic pole portion of the rotor core 2.

Unlike the first to fifteenth embodiments, the rotor 1 of this embodiment is characterized in that each high-coercive-force permanent magnet 3A is arranged in a diametrical direction of the rotor 1 and each low-coercive-force permanent magnet 4A is arranged in a circumferential direction on the inner circumferential side of the rotor core 2.

As illustrated in FIG. 16B, the rotor 1 of the embodiment is accommodated, like the other embodiments, at the center of a stator 23 of the permanent-magnet-type rotating electrical machine 20, so that the rotor 1 is driven by a magnetic field created by a stator coil 21. A magnetic field generated by a stator current acting on each high-coercive-force permanent magnet 3A arranged in the diametrical direction forms a magnetic path passing through a stator core 24, an air gap 22, the pole portion 7, the high-coercive-force permanent magnet 3A arranged in the diametrical direction (traversing), an adjacent pole portion 7, and the stator core 24. On the other hand, a magnetic field generated by a stator current acting on the low-coercive-force permanent magnet 4A circumferentially arranged on the inner circumferential side forms a magnetic path passing through the stator core 24, the air gap 22, the pole portion 7, the low-coercive-force permanent magnet 4A arranged in the circumferential direction (traversing), an innermost circumferential part of the rotor core 2, an adjacent innermost circumferential part of the rotor core 2, a circumferentially adjacent low-coercive-force permanent magnet 4A (traversing), an adjacent pole portion 7, and the stator core 24.

Accordingly, a magnetic field created by a current acts on two circumferentially adjacent low-coercive-force permanent magnets 4A and one diametrically arranged high-coercive-force permanent magnet 3A. If the high- and low-coercive-force permanent magnets 3A and 4A have the same thickness, a magnetic field created by the current and acting on the diametrically arranged high-coercive-force permanent magnet 3A is twice as strong as that acting on the circumferentially arranged low-coercive-force permanent magnet 4A.

A rotating electrical machine that provides high output by cooling a stator with water or oil and increasing specific electric loading (ampere-turn per unit circumferential length) causes a large magnetic field due to a load current. This strong magnetic field due to the load current causes partial demagnetization. Even if used as such a high-output-density rotating electrical machine, the permanent-magnet-type rotating electrical machine 20 of the embodiment can reduce the influence of partial demagnetization because it arranges the low-coercive-force permanent magnets 4A, which are easily affected by a magnetic field, on the inner circumferential side. The permanent-magnet-type rotating electrical machine 20 of the embodiment magnetizes the permanent magnets with a d-axis current of the rotor 1, to vary the linkage flux of the permanent magnets, suppress changes in the characteristics of the permanent magnets due to a load current, and maintain high output.

According to the embodiment, the iron core recesses 8 are formed if needed. The outer circumferential face of the rotor core 2 may have a true circular section like the first embodiment illustrated in FIG. 2, or any shape illustrated in FIGS. 7 and 9. The first hollow 5 may have the shape illustrated in FIGS. 14 and 15. Also, the high-coercive-force permanent magnet 3A arranged on the outer circumferential side may have any shape illustrated in FIGS. 12, 13, and 14.

Seventeenth Embodiment

Figure 17:
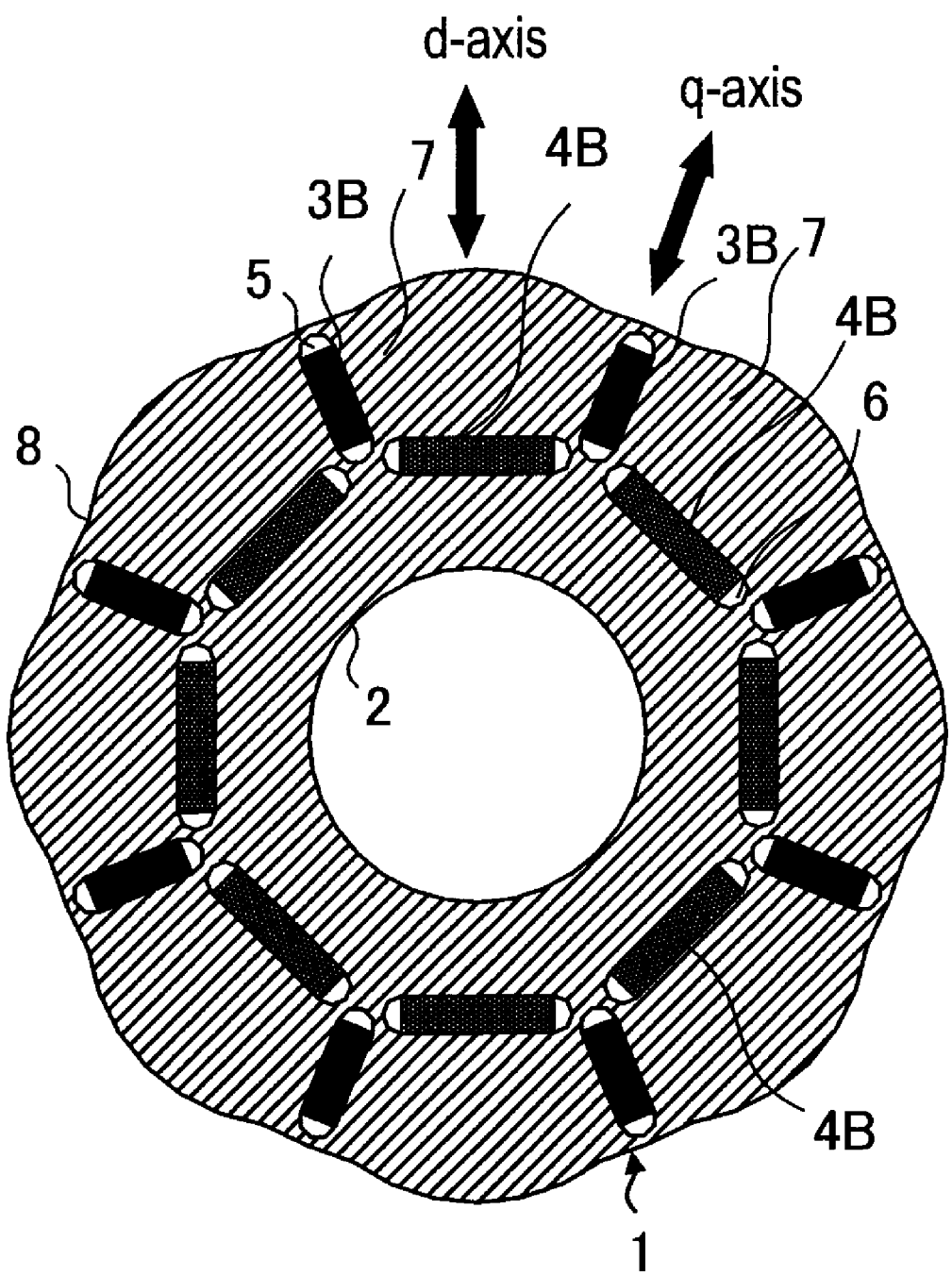
FIG. 17 is a sectional view illustrating a rotor of a permanent-magnet-type rotating electrical machine according to a seventeenth embodiment of the present invention.

FIG. 17 is a sectional view illustrating a rotor 1 of a permanent-magnet-type rotating electrical machine according to a seventeenth embodiment of the present invention. The same or equivalent parts as those of FIGS. 2, 7 to 9, 11, and 13 to 16 are illustrated with the same reference marks. The rotor 1 of the embodiment is characterized in that high-coercive-force permanent magnets 3B are arranged in a diametrical direction of the rotor core 2 and high-coercive-force permanent magnets 4B are arranged in a circumferential direction on the inner circumferential side of the rotor core 2. The other configuration is the same as that of the sixteenth embodiment illustrated in FIG. 16A. The permanent-magnet-type rotating electrical machine 20 employing the rotor 1 of the embodiment is similar to that illustrated in FIG. 16B.

The high-coercive-force permanent magnets 3B and 4B each have a magnetizing direction thickness so that a magnetized state of the magnet can be changed with a magnetizing field created by a d-axis current. Alternatively, the diametrically arranged high-coercive-force permanent magnets 3B or the circumferentially arranged high-coercive-force permanent magnets 4B have a magnetizing direction thickness so that a magnetized state of the magnets can be changed with a magnetizing field created by a d-axis current.

The rotor 1 of the embodiment arranges high-coercive-force permanent magnets as the permanent magnets 3B arranged in the diametrical direction of the rotor core 2 and the permanent magnets 4B circumferentially arranged on the inner circumferential side of the rotor core 2, to provide stable characteristics with respect to disturbances such as a magnetic field generated by a load current.

A rotating electrical machine can provide high output by cooling a stator with water or oil and increasing a specific electric loading (ampere-turn per unit circumferential length). This, however, increases a magnetic field created by a load current and the strong magnetic field created by the load current partly demagnetizes permanent magnets. In the case of such a rotating electrical machine of high output density, employing high-coercive-force permanent magnets results in reducing the influence of the magnetic field created by the load current and stabilizing the characteristics of the permanent magnets. The permanent magnets, however, must have a sufficient thickness so that the magnets may be magnetized with a magnetizing field created by a d-axis current.

For example, the diametrically arranged permanent magnets 3B are formed to be thinner than the circumferentially arranged permanent magnets 4B, so that a small magnetizing field (small d-axis current) is sufficient to adjust the flux amount of the permanent magnets.

According to the embodiment, the recesses 8 are formed as needed. The outer circumferential face of the rotor core 2 may have a true circular section like the first embodiment illustrated in FIG. 2, or any shape illustrated in FIGS. 7 and 9. The first hollow 5 may have the shape illustrated in FIGS. 14 and 15. Also, the high-coercive-force permanent magnet 3A arranged on the outer circumferential side may have any shape illustrated in FIGS. 12, 13, and 14.

Eighteenth Embodiment

A permanent-magnet-type rotating electrical machine according to an eighteenth embodiment of the present invention will be explained with reference to FIG. 18. The same or equivalent parts as those of FIGS. 2, 7 to 9, 11, and 13 to 17 are illustrated with the same reference marks.

Figure 18:
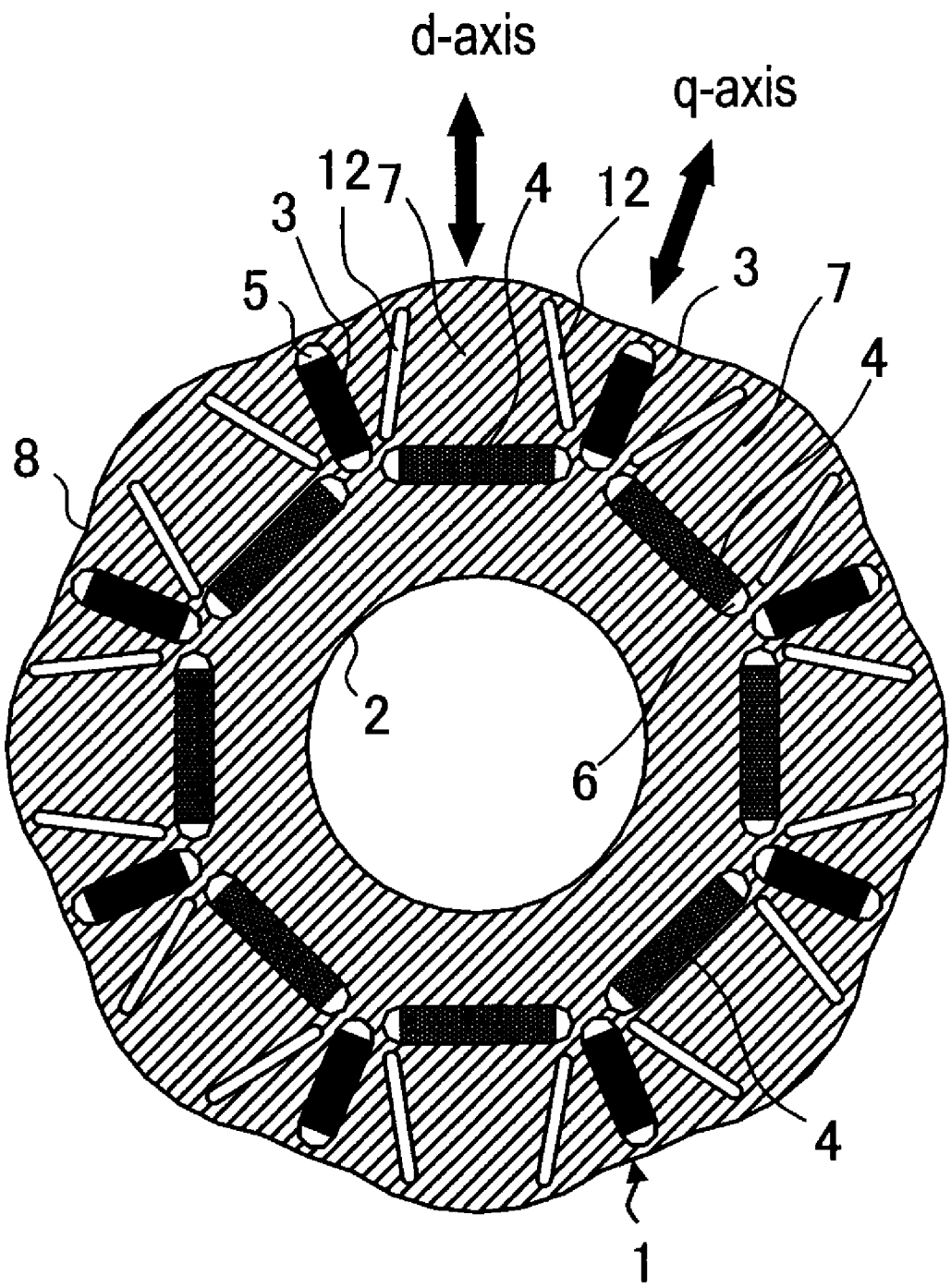
FIG. 18 is a sectional view illustrating a rotor of a permanent-magnet-type rotating electrical machine according to an eighteenth embodiment of the present invention.
Figure 19:
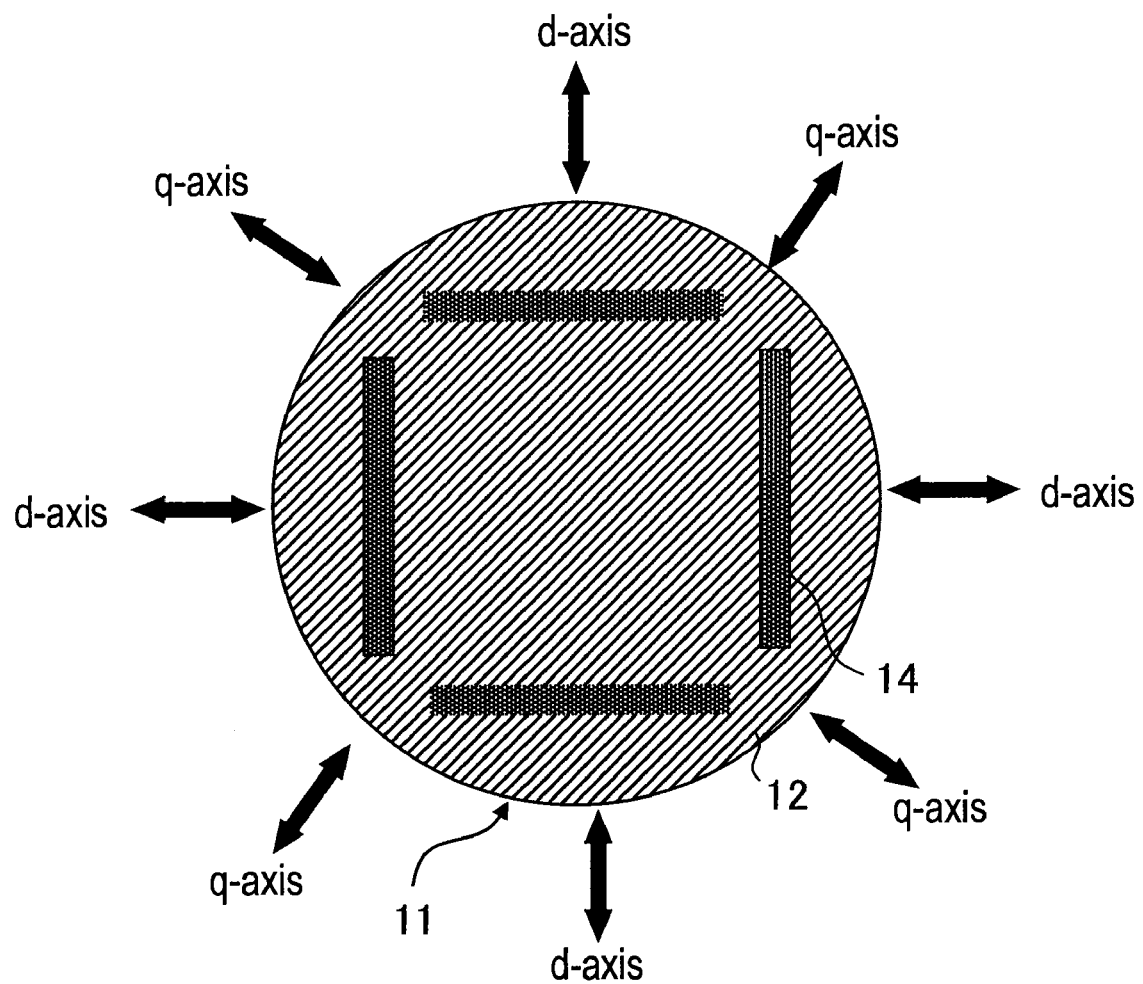
FIG. 19 is a sectional view illustrating a rotor of an internal-permanent-magnet motor according to a related art.

This embodiment is characterized in that, as illustrated in FIG. 18, a rotor core 2 is provided with slits 12 for blocking a demagnetizing field caused by permanent magnets. On the outer circumferential side of the rotor core 2, low-coercive-force permanent magnets 3 are arranged in diametrical directions, and on the inner circumferential side of the rotor core 2, high-coercive-force permanent magnets 4 are arranged in a circumferential direction. The slits 12 for blocking a demagnetizing field caused by the permanent magnets are arranged in pole portions 7 of the rotor core 2, so that the slits 12 may block flux of the low-coercive-force permanent magnets 3 and flux of the high-coercive-force permanent magnets 4.

The low- and high-coercive-force permanent magnets 3 and 4 are arranged in the same iron core, and therefore, are influenced by a demagnetizing field. For this, the embodiment interposes the slits 12 between the permanent magnets, to minimize the demagnetizing field not to affect each permanent magnet. Accordingly, the low-coercive-force permanent magnets 3 under load will not be demagnetized by a demagnetizing field created by the high-coercive-force permanent magnets 4 and a demagnetizing field created by a load current. Also, flux of the low-coercive-force permanent magnets 3 may easily be increased or decreased by a magnetizing field created by a d-axis current without the influence of the high-coercive-force permanent magnets 4. The same effect will be obtained when the permanent magnets 3 and 4 in the rotor core 2 are all high-coercive-force permanent magnets.

Nineteenth Embodiment

Each of the first to eighteenth embodiments mentioned above may be configured to reverse the magnetizing direction of the low-coercive-force permanent magnets from one to another with the use of a magnetic field created by a current passed through a stator coil.

A magnetizing field created by a d-axis current is used to reduce the flux amount of permanent magnets arranged in the diametrical or circumferential direction of the rotor 1. Reducing the flux amount of the permanent magnets to be magnetized to zero results in minimizing the total linkage flux amount of all permanent magnets. The embodiment further magnetizes the permanent magnets to be magnetized to the opposite direction, to subtract the flux thereof from the flux of the other permanent magnets, to further reduce the total linkage flux amount of all permanent magnets. Theoretically, the total linkage flux amount will be zeroed. When the rotating electrical machine is driven at high speed under no load, the embodiment can minimize an induced voltage and iron loss.

Magnetizing directions of the permanent magnets in the second and after the second embodiments are the same as those of the first embodiment illustrated in FIG. 2.

The invention claimed is:

1. A permanent-magnet-type rotating electrical machine comprising:
a stator provided with a stator coil; and
a rotor having a rotor core in which there are arranged a plurality of low-coercive-force permanent magnets and a plurality of high-coercive-force permanent magnets each coercive force is equal to or larger than twice that of each low-coercive-force permanent magnet,
wherein
each low-coercive-force permanent magnet is arranged in a radial direction of the rotor that agrees with a q-axis serving as an inter-polar center axis and is magnetized in a direction orthogonal to the radial direction,
each high-coercive-force permanent magnet is arranged on the inner circumferential side of the rotor between two low-coercive-force permanent magnets to be oriented in a circumferential direction of the rotor and is magnetized in a direction orthogonal to the circumferential direction of the rotor,
a diametrical section of the rotor is shaped so that the low- and high-coercive-force permanent magnets surround a part of the rotor core serving as a magnetic pole portion, and
a flux density or both a flux density and a magnetizing direction of each low-coercive-force permanent magnet is irreversibly adjusted by passing a pulse current to the stator coil for a short time, an amount of the pulse current being adequate to form a magnetic field that is sufficient to irreversibly change the flux density or both the flux density and the magnetizing direction of each low-coercive-force permanent magnet while no magnetization that may cause irreversible demagnetization occurs on each high-coercive-force permanent magnet.

2. The permanent-magnet-type rotating electrical machine as set forth in claim 1, wherein the high-coercive-force permanent magnet is arranged on the outer circumferential side of the rotor core and the low-coercive-force permanent magnet is arranged on the inner circumferential side of the rotor core.

3. The permanent-magnet-type rotating electrical machine as set forth in claim 1, wherein a counter electromotive voltage of the high-coercive-force permanent magnet generated when the rotor reaches a maximum rotation speed is set to be equal to or lower than a withstand voltage of electronic parts of an inverter serving as a power source of the permanent-magnet-type rotating electrical machine.

4. The permanent-magnet-type rotating electrical machine as set forth in claim 1, wherein a flux amount of the high-coercive-force permanent magnet in a state in which a flux amount of the low- and high-coercive-force permanent magnets is maximum is smaller than a maximum flux amount of the low-coercive-force permanent magnet.

5. The permanent-magnet-type rotating electrical machine as set forth in claim 1, wherein the rotor core is shaped so that magnetic resistance in the direction of the d-axis serving as the polar center axis of the rotor is small and magnetic resistance in the direction of the q-axis serving as the inter-polar center axis is large.

6. The permanent-magnet-type rotating electrical machine as set forth in claim 1, wherein the low-coercive-force permanent magnet is arranged on the outer circumferential side of the rotor core and is oriented in the diametrical direction of the rotor and an air gap side of the rotor core is recessed around a radial outer end of the low-coercive-force permanent magnet except the radial outer end part.

7. The permanent-magnet-type rotating electrical machine as set forth in claim 1, wherein the low-coercive-force permanent magnet is arranged on the outer circumferential side of the rotor core and is oriented in the diametrical direction of the rotor, a polar middle part of the rotor core defines an outermost circumferential part of the rotor core, and an air gap side of the rotor core is recessed from the polar middle part toward the radial outer end of the low-coercive-force permanent magnet.

8. The permanent-magnet-type rotating electrical machine as set forth in claim 1, wherein the high-coercive-force permanent magnet is arranged on the outer circumferential side of the rotor core and is oriented in the diametrical direction of the rotor and an air gap side of the rotor core is recessed around a radial outer end of the high-coercive-force permanent magnet except the radial outer end part.

9. The permanent-magnet-type rotating electrical machine as set forth in claim 1, wherein the high-coercive-force permanent magnet is arranged on the outer circumferential side of the rotor core and is oriented in the diametrical direction of the rotor, a polar middle part of the rotor core defines an outermost circumferential part of the rotor core, and an air gap side of the rotor core is recessed from the polar middle part toward the radial outer end of the high-coercive-force permanent magnet.

10. The permanent-magnet-type rotating electrical machine as set forth in claim 1, wherein the polar middle part of the rotor core is composed of a circular arc defined with a maximum radius of the rotor and a central angle of the circular art of the polar middle part is in the range of 90 to 140 degrees in electrical angle.

11. The permanent-magnet-type rotating electrical machine as set forth in claim 1, wherein the low-coercive-force permanent magnet is arranged on the outer circumferential side of the rotor core and an air-gap-side end of the low-coercive-force permanent magnet is provided with a magnetic barrier whose circumferential length is longer than the thickness of the low-coercive-force permanent magnet.

12. The permanent-magnet-type rotating electrical machine as set forth in claim 1, wherein the magnetic pole portion of the rotor core is provided with a slit to increase magnetic resistance in the direction of the q-axis serving as the inter-polar center axis of the rotor.

13. The permanent-magnet-type rotating electrical machine as set forth in claim 1, wherein, at the time of high-speed rotation with a voltage of the permanent-magnet-type rotating electrical machine being around or over a power source maximum voltage, the low-coercive-force permanent magnet is irreversibly magnetized with a magnetic field created by the pulse current of the stator coil in such a way as to decrease linkage flux of the low- and high-coercive-force permanent magnets, thereby adjusting a total linkage flux amount.

14. The permanent-magnet-type rotating electrical machine as set forth in claim 1, wherein, at the time of low-speed rotation with a voltage of the permanent-magnet-type rotating electrical machine being equal to or lower than a power source maximum voltage, the low-coercive-force permanent magnet is irreversibly magnetized with a magnetic field created by the pulse current of the stator coil in such a way as to increase linkage flux of the low- and high-coercive-force permanent magnets, and at the time of high-speed rotation with a voltage of the permanent-magnet-type rotating electrical machine being around or over the power source maximum voltage, the low-coercive-force permanent magnet is irreversibly magnetized with a magnetic field created by the pulse current of the stator coil in such a way as to decrease linkage flux of the low- and high-coercive-force permanent magnets, thereby adjusting a total linkage flux amount.

15. The permanent-magnet-type rotating electrical machine as set forth in claim 1, wherein a flux amount of the low-coercive-force permanent magnet is irreversibly adjusted with a magnetic field created by the pulse current of the stator coil in such a way as to zero a linkage flux amount of the low- and high-coercive-force permanent magnets.

16. The permanent-magnet-type rotating electrical machine as set forth in claim 1, wherein a flux amount provided by the low-coercive-force permanent magnet is equal to a flux amount provided by the high-coercive-force permanent magnet.

17. The permanent-magnet-type rotating electrical machine as set forth in claim 1, wherein the magnetizing direction of the low-coercive-force permanent magnet is irreversibly reversed from one to another according to a magnetic field created by the pulse current of the stator coil.

18. The permanent-magnet-type rotating electrical machine as set forth in claim 1, wherein the rotor core is provided with a slit to reduce demagnetizing fields of the low- and high-coercive-force permanent magnets acting on each other.

* * * * *